June 27, 1967
R. E. HEAD
3,327,969
CONVERTIBLE AIRCRAFT
Filed Oct. 12, 1965
9 Sheets-Sheet 1
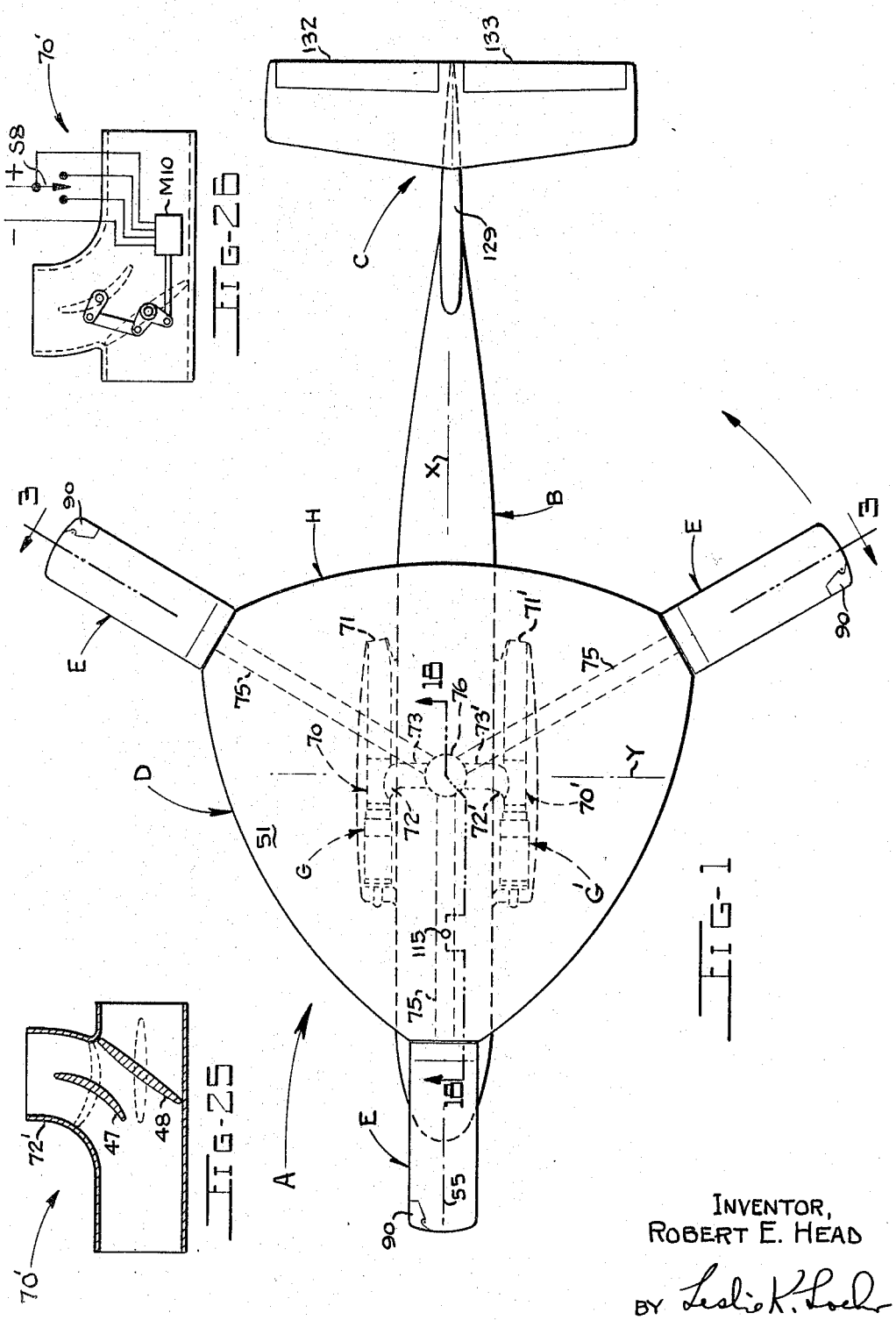
INVENTOR,
ROBERT E. HEAD
BY *Leslie K. Locher*
HIS AGENT.

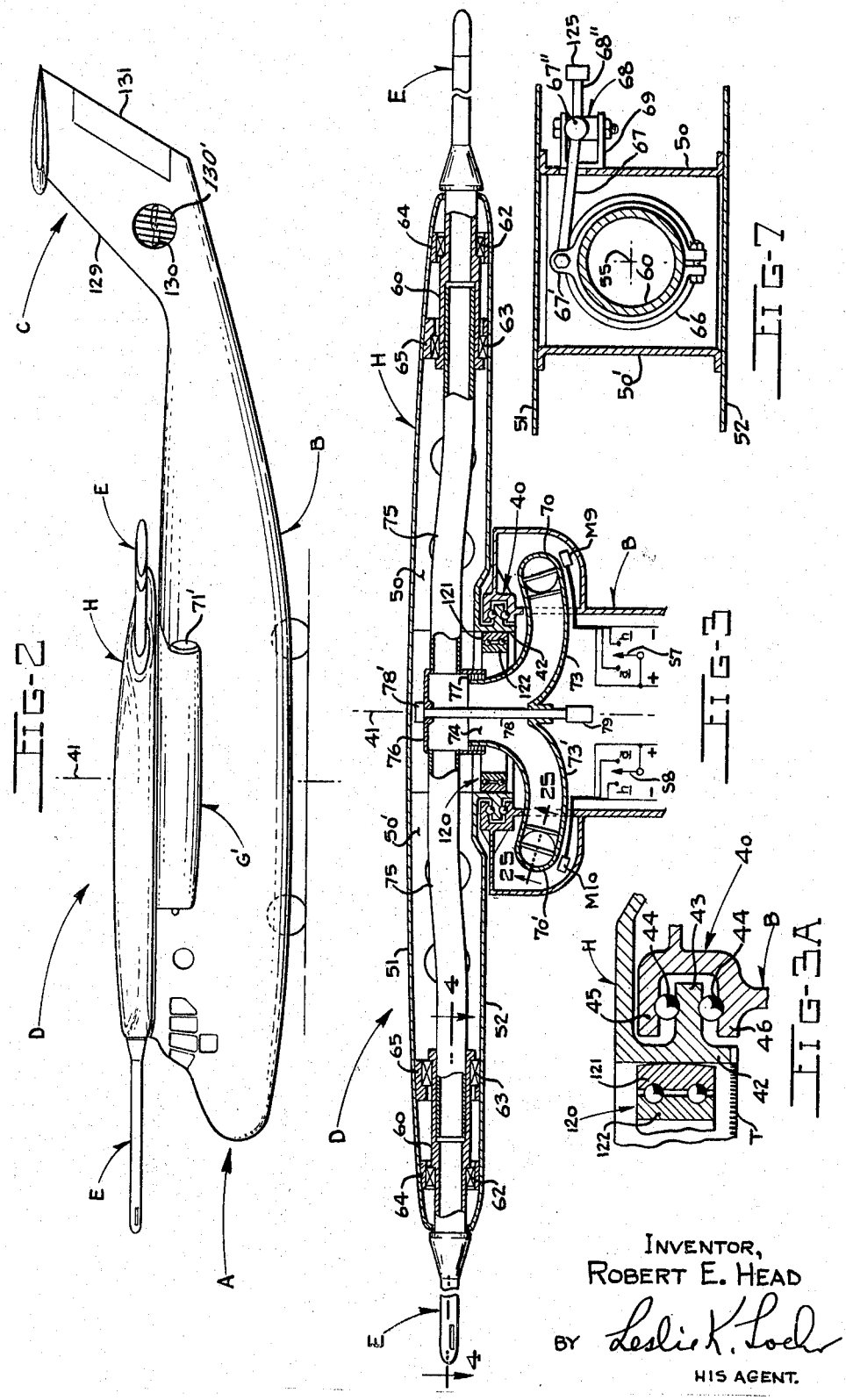

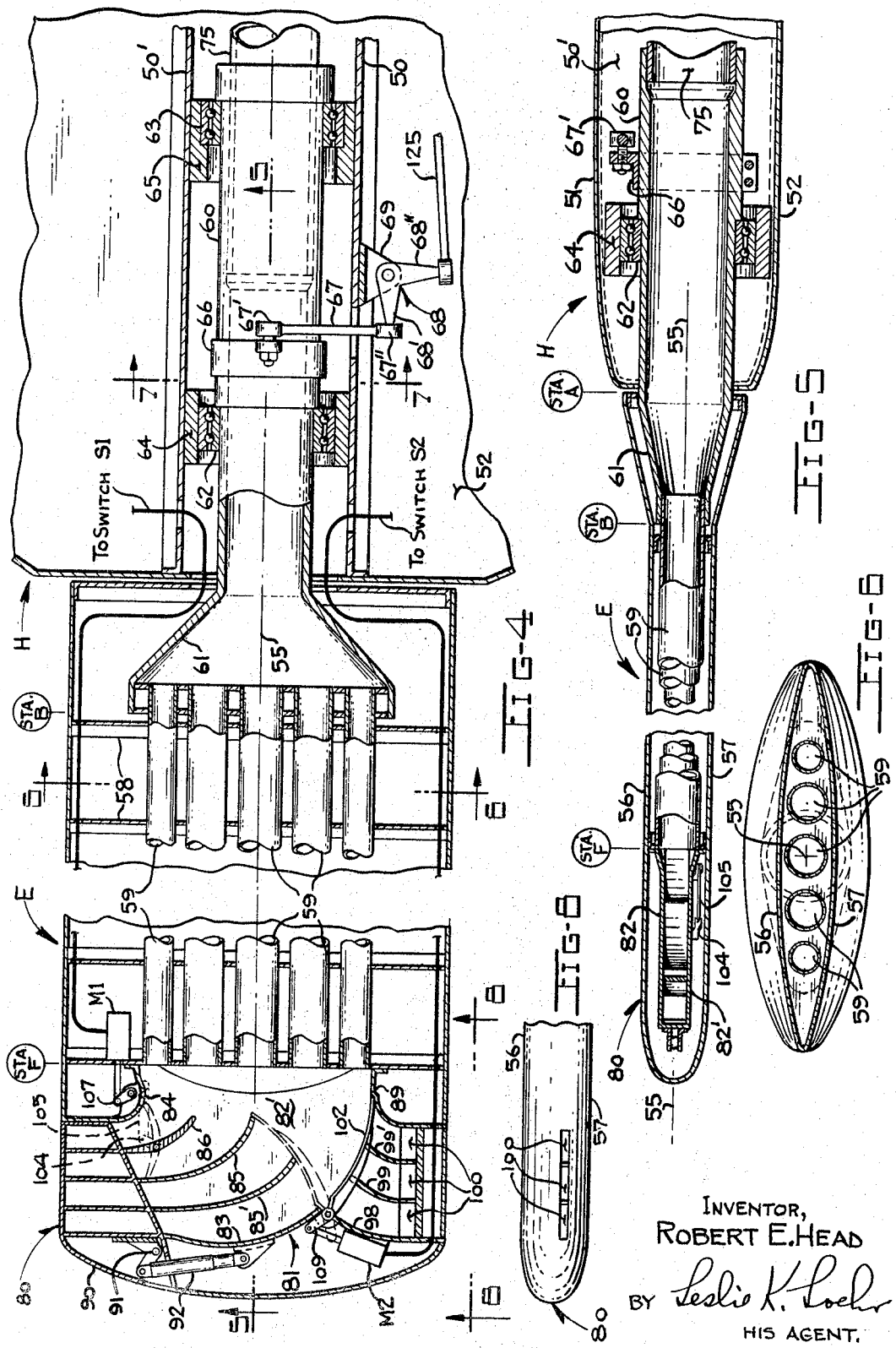

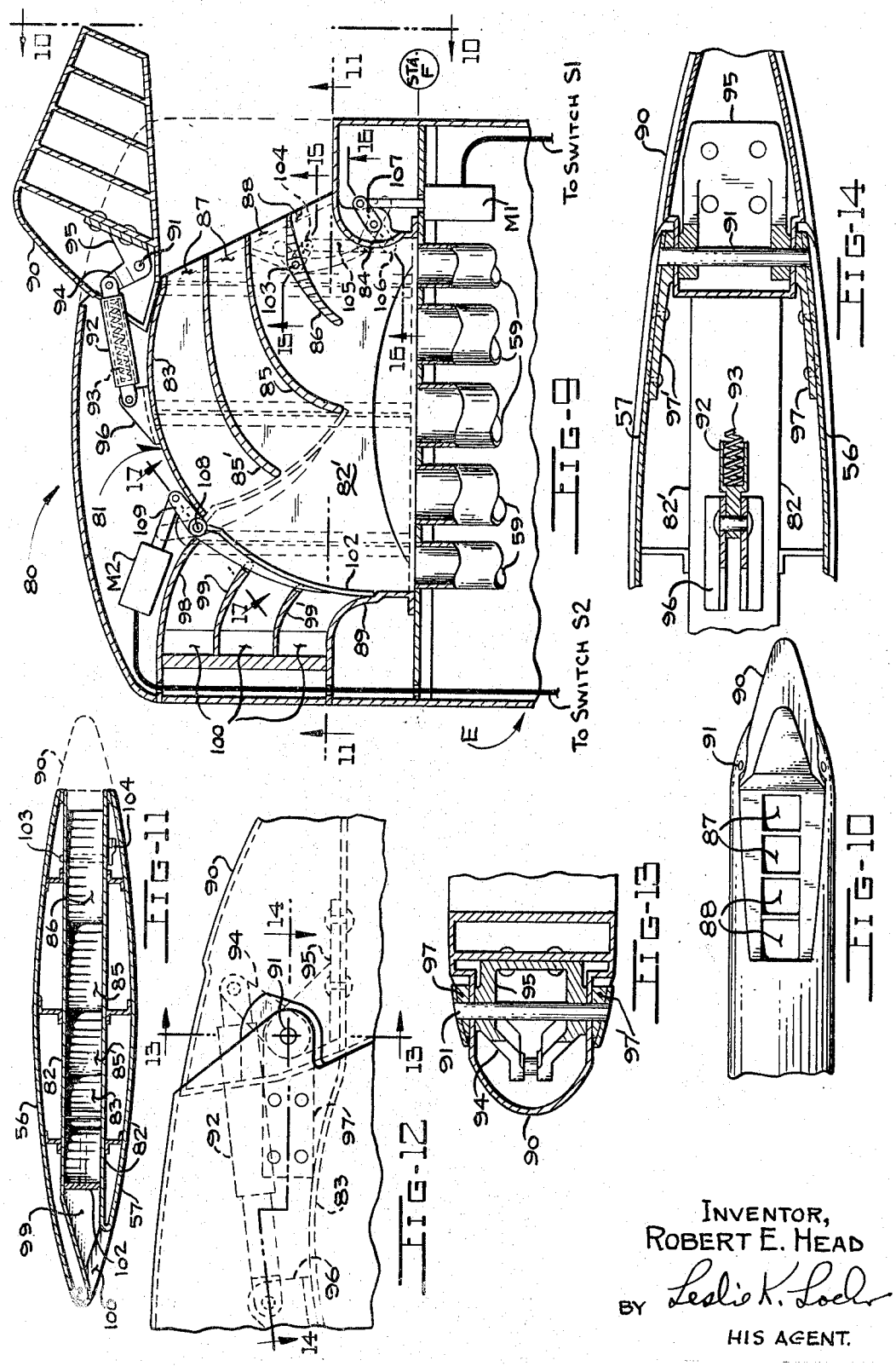

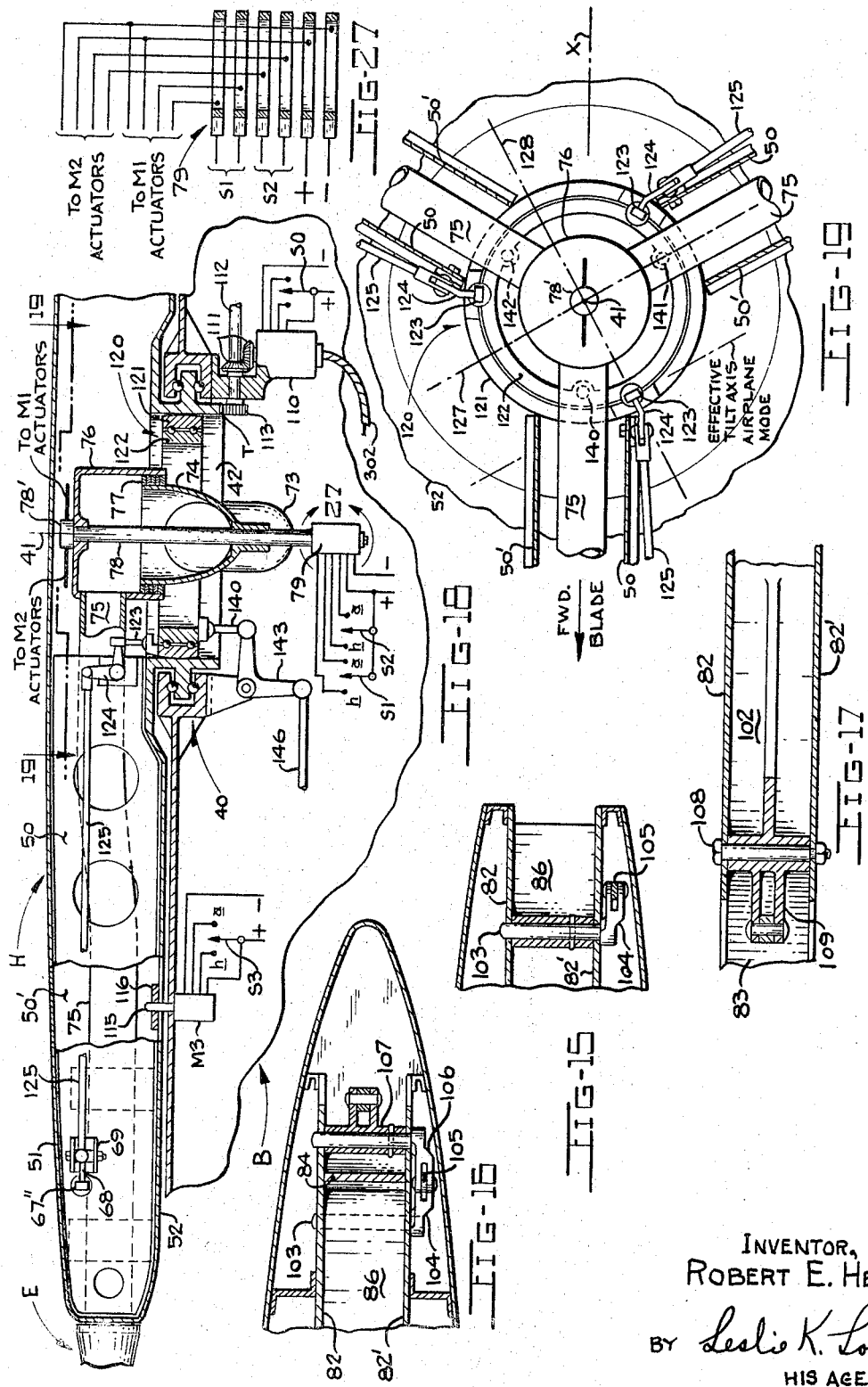

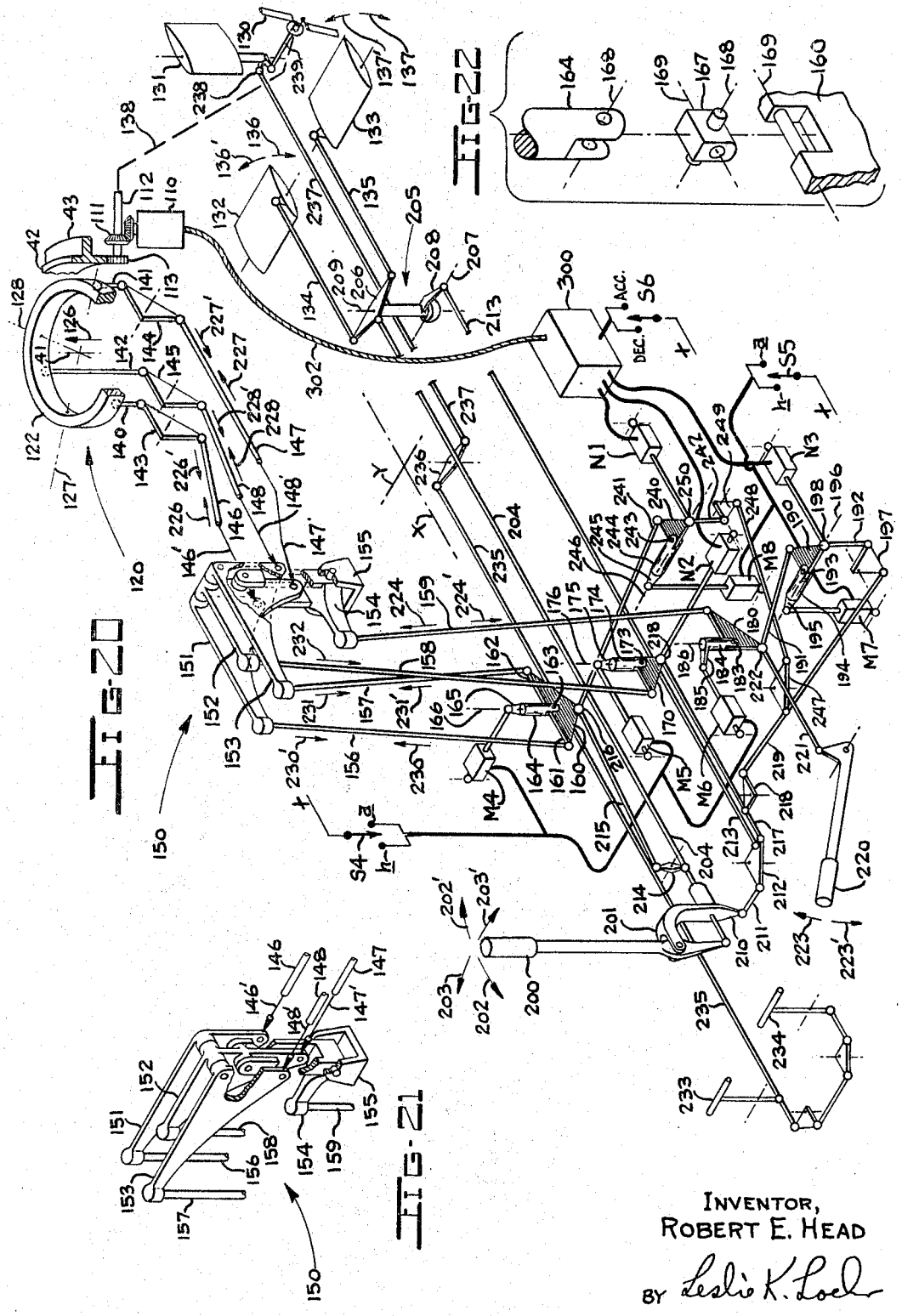

INVENTOR,
ROBERT E. HEAD
BY Leslie K. Loch
HIS AGENT.

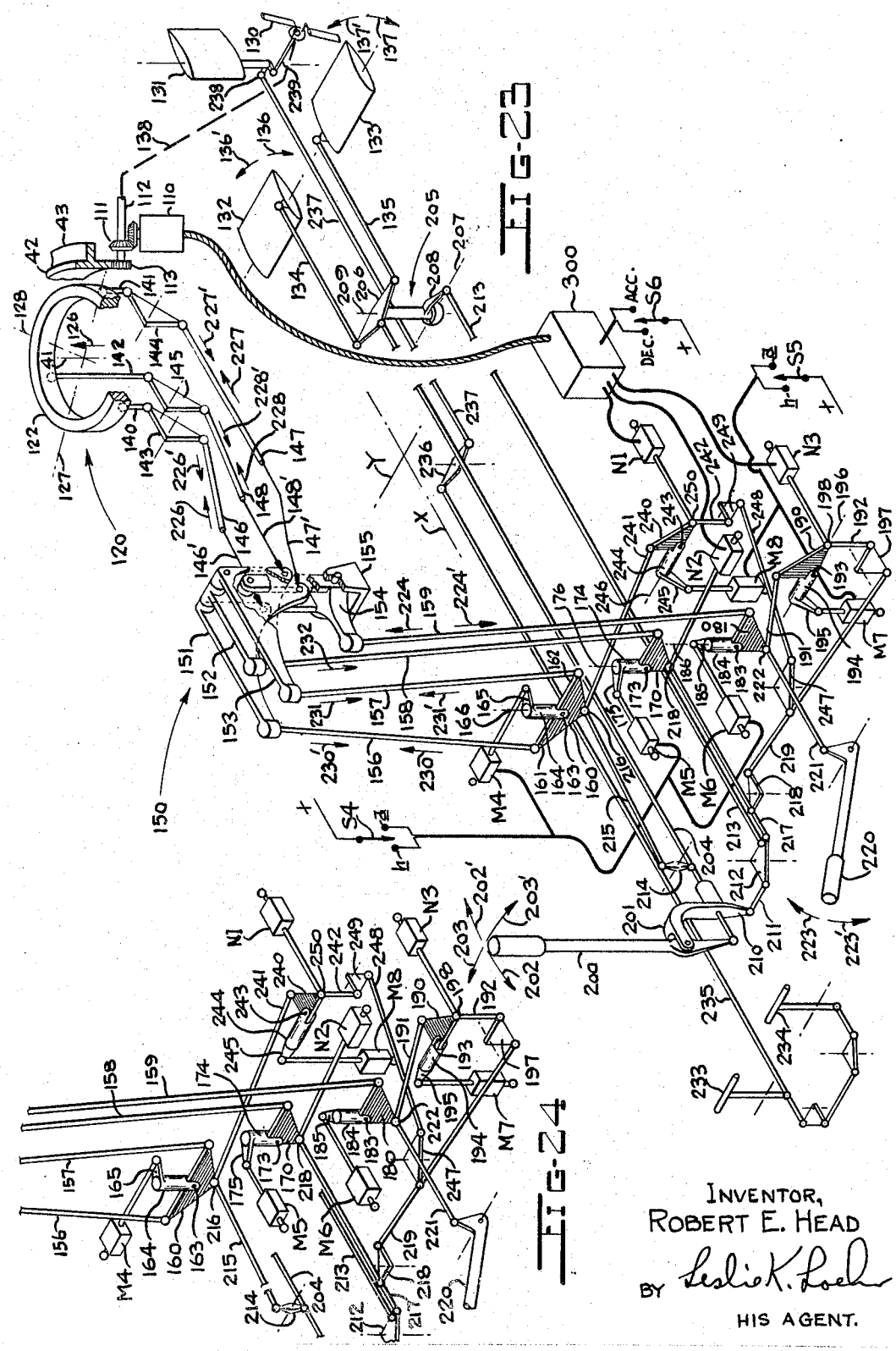

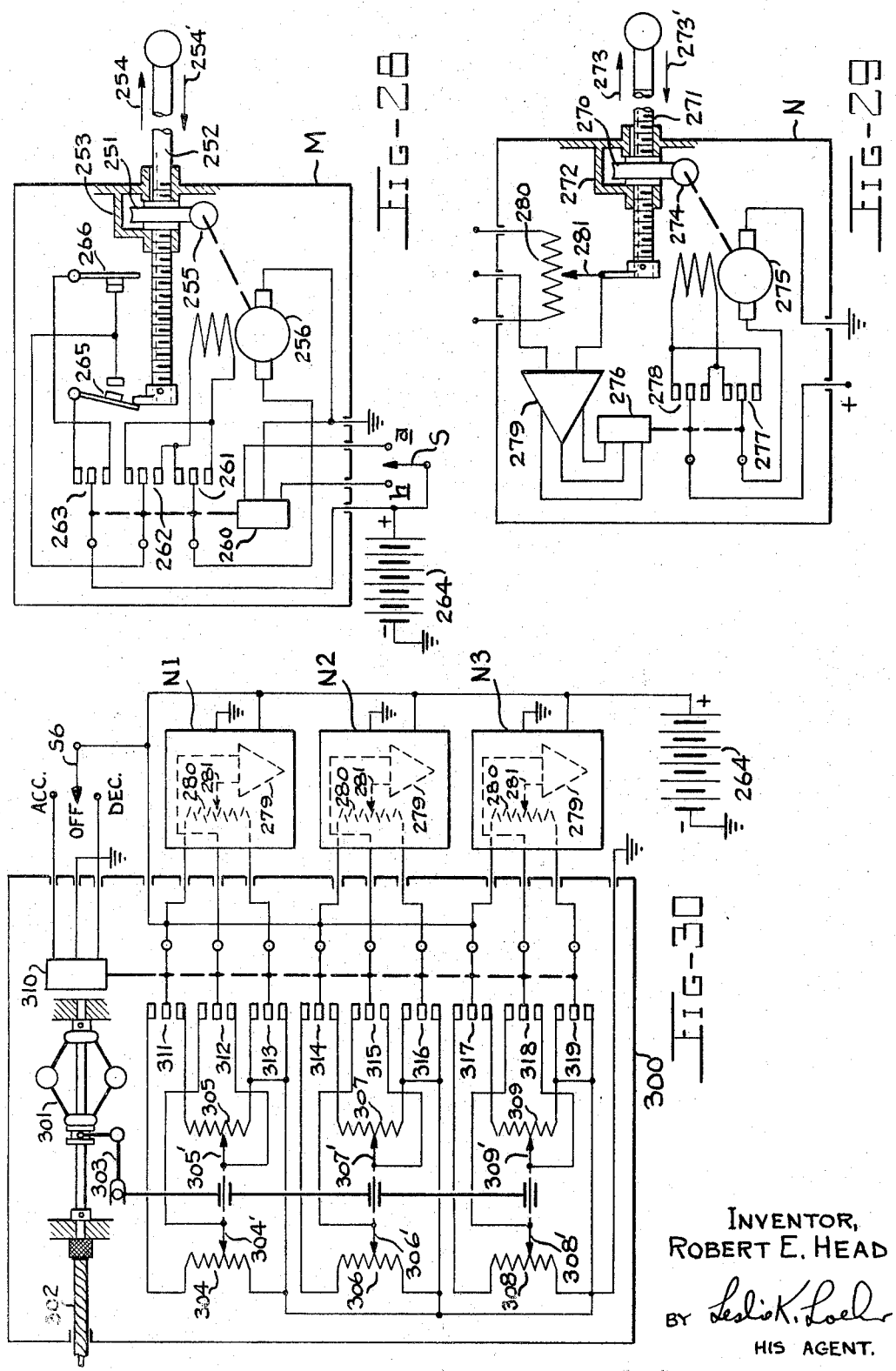

United States Patent Office 3,327,969
Patented June 27, 1967

3,327,969
CONVERTIBLE AIRCRAFT
Robert E. Head, Palos Verdes Estates, Calif., assignor to Hughes Tool Company, Houston, Tex., a corporation of Delaware
Filed Oct. 12, 1965, Ser. No. 495,241
10 Claims. (Cl. 244—7)

The present invention relates to convertible aircraft, and more particularly to such aircraft which are adapted for in-flight conversion from a helicopter type of flight to a conventional airplane type of flight, and vice versa.

Aircraft of this nature, commonly referred to as convertiplanes or VTOL aircraft are being widely considered as desirable means of transportation because of their capabilities of operating in both helicopter and conventional airplane modes of flight.

Of the prior art convertiplanes, some employ a fixed wing in conjunction with a rotary wing in a manner similar to the autogyro; while some mount thrust-producing means on wings that are tiltable from horizontal to vertical positions and vice versa, such that the helicopter flight mode is effected when the wings are vertically disposed and such that in-flight transition from the helicopter mode to the airplane mode is effected by gradually tilting the wings to their horizontal positions; whereas, other prior art convertiplanes employ a rotary wing such that rotation of the wing causes the craft to perform as a helicopter, and such that when the wing is stopped the craft operates as a conventional airplane. In regard to the above-mentioned prior art convertiplanes, reference is made to U.S. Patents 2,544,497, 3,035,789, 3,105,659, and 3,159,360.

Major problems in constructing a satisfactory convertiplane results from the fact that to be completely acceptable, the conversion of such aircraft from helicopter mode of flight to the state of conventional airplane flight and vice versa, must be a smooth transition under absolute and positive control of the pilot, without sudden changes in the attitude or noticeable deviations in flight speed or altitude of the aircraft. Hence, the present invention is concerned with an improved design for convertiplanes in which the transition from one flight mode to another is accomplished without hazardous changes in the flight attitude or dangerous alterations in the flight speed or altitude of the aircraft.

To obtain these desirable qualities, the present invention contemplates a convertiplane employing a rigid rotor having coplanar thrust-producing blades, for achieving helicopter flight, which are attached to a supporting hub having a fairing constructed of adequate size and shape to provide the lifting forces necessary to sustain the craft in an airplane flight mode such that at a predetermined forward speed during helicopter flight, rotation of the rotor can be quickly stopped to change the rotor's function from a helicopter lifting-rotor to that of a stationary sustaining wing for conventional airplane flight, and such that at another predetermined forward speed during airplane flight, rotor rotation can be reestablished so that the rotor resumes its function as a helicopter sustaining-rotor.

Moreover, the convertiplane or the VTOL aircraft contemplated by this invention is also characterized by a jet-propulsion system in which pressurized gas is expelled to provide reaction forces at the outboard ends of the thrust-producing blades, which forces are particularly suitable for effecting rotor rotation during helicopter flight and for quickly stopping the rotor when conversion to conventional airplane flight is desired; and in which the pressurized gas is diverted to thrust-producing nozzles for providing reaction forces of the character required to sustain forward flight of the convertiplane when the above-mentioned conversion is completed. Furthermore, a pilot-operated control system is contemplated which permits absolute and positive pilot control of the convertiplane throughout all regimes of flight.

Accordingly, it is a primary object of this invention to provide an aircraft having the abilities and operating characteristics of a helicopter plus the abilities and operating characteristics of a conventional airplane, and to provide such an aircraft in which the transition from the helicopter mode of flight to the flight mode of conventional aircraft and vice versa, is easily accomplished without major changes in the flight attitude, and without major loss of flight speed and altitude.

It is another object to provide such an aircraft with a rigid rotor having coplanar thrust-producing blades, which rotor is constructed and arranged for both rotating and stationary conditions in a substantially horizontal plane above the aircraft with the abilities and characteristics essential to the helicopter mode of flight when the rotor is rotating, and with the abilities and characteristics essential to the conventional airplane flight mode when the rotor is stationary; and to further provide such a rotor characterized by a rigid hub having a symmetrical plan form of adequate area, and a suitable composite airfoil section for providing the aerodynamic lifting forces necessary for the conventional airplane mode of flight.

It is another object to provide an aircraft of the above character employing a jet propulsion system for providing the propulsive forces required for the airplane mode of flight and for providing propulsive forces and applying same to the rotor so as to cause rotor rotation for effecting the helicopter mode of flight.

It is a further object to provide such an aircraft in which the propulsion system includes a pressurized-gas generator, and in which the thrust-producing blades are characterized by tip jets for expelling pressurized gas such that the reaction forces are effective for rotating the rotor such that the blades impart sufficient downward velocity to large masses of air for producing the upward thrust necessary to sustain the aircraft during the helicopter flight mode. It is also an object to provide such blades having additional tip jets which are arranged for expelling pressurized gas such that reaction forces thereof are effective for quickly stopping the thrust-producing rotation of the rotor mechanism when transition from the helicopter flight mode to the airplant flight mode is desired; and to further provide a system of remotely controlled valves or dampers for selectively controlling the operation of the tip jets for causing rotor rotation or for stopping such rotation.

It is an additional object to provide a convertiplane of the above character in which the rotor is characterized by three thrust-producing blades attached to the rotor hub so as to accommodate pitch-changing or feathering movements of the blades about their spanwise axes such that while the rotor is in the stationary condition, two of the blades are effective as ailerons in the airplane flight mode; and such that while the rotor is in the rotating condition, the pitch of all blades can be varied for altering their thrust-producing properties during the helicopter flight mode. It is also an object to provide blade-pitch-changing means including a swashplate mechanism responsive to pilot-actuated controls for varying the pitch of all three blades during the helicopter flight mode, and for varying the pitch of only two of the three blades during the mode of airplane flight such that said two blades are effective as roll-controlling ailerons.

It is a further object of the invention to provide blade-pitch-changing means of the above character in which the pilot-actuated controls include a pitch-programming mechanism responsive to rotational velocity of the rotor for effecting blade-pitch variations during transition from one flight mode to the other such that substantially constant lift is automatically maintained by the rotor as it changes from a rotating condition to a stationary condition, and vice versa.

It is another object to provide such blade-pitch-changing means in which the pilot-actuated controls include collective and cyclic pitch control levers coupled to the swashplate by a linkage mechanism of a character such that during the helicopter mode of flight, the collective pitch control lever is effective for collectively causing changes in the pitch of all three blades for controlling vertical flight, and the cyclic pitch control lever is effective for cyclically causing changes in the pitch of all three blades for controlling lateral and longitudinal flight; said linkage mechanism being further characterized in that during transition from one flight mode to the other, the collective and cyclic pitch control levers may be rendered ineffective in which case their blade-pitch-changing functions may be transferred to and are performed by the pitch-programming mechanism.

It is an additional object to provide such a linkage mechanism in which the couplings between the collective and cyclic pitch control levers and the swashplate for effecting collective and cyclic pitch changes of all three blades are completely neutralized when the rotor is stopped for the airplane flight mode, and another coupling between the cyclic pitch control lever and the swashplate is established whereby lateral movement of the cyclic lever causes equal but opposite changes in pitch of only two of the three blades such that said two blades are effective as roll-controlling ailerons in the airplane flight mode.

It is a further object of the invention to provide a convertiplane of the foregoing character, having a tail section including a variable thrust-producing tail rotor, a vertical rudder, and a pair of horizontal rudders, of which the tail rotor and vertical rudder are connected to pilot-actuated pedals for effecting control of flight direction, and the horizontal rudders are connected to the pilot-actuated cyclic pitch control lever for effecting control of the roll and horizontal-pitching movements of the craft such that during all modes of flight including transition from one mode to the other, the flight attitude of the convertiplane is controllable by the pilot.

These and other objects and advantages will become more apparent from the following description considered in connection with the accompanying drawings; it being expressly understood, however, that the drawings are for the purpose of illustration and description only, and are not intended as a definition of the limits of the invention.

In the drawings:

FIG. 1 is a plan view of an aircraft embodying the present invention;

FIG. 2 is a side elevational view of the aircraft shown in FIG. 1;

FIG. 3 is a sectional view of the lifting rotor taken on line 3—3 of FIG. 1;

FIG. 3A is an enlarged showing of a portion of FIG. 3;

FIG. 4 is an enlarged sectional view of a portion of the lifting wing taken on line 4—4 of FIG. 3;

FIG. 5 is a sectional view taken on line 5—5 of FIG. 4;

FIG. 6 is a sectional view taken on line 6—6 of FIG. 4;

FIG. 7 is a sectional view taken on line 7—7 of FIG. 4;

FIG. 8 is an elevational view taken on line 8—8 of FIG. 4;

FIG. 9 is an enlarged sectional view showing the outboard end of the blade shown in FIG. 4;

FIG. 10 is an elevational view taken on line 10—10 of FIG. 9;

FIG. 11 is a sectional view taken on line 11—11 of FIG. 9;

FIG. 12 is a fragmentary plan view showing a portion of the outboard end of the blade seen in FIGS. 4 and 9;

FIG. 13 is a sectional view taken on line 13—13 of FIG. 12;

FIG. 14 is a sectional view taken on line 14—14 of FIG. 12;

FIG. 15 is a sectional view taken on line 15—15 of FIG. 9;

FIG. 16 is a sectional view taken on line 16—16 of FIG. 9;

FIG. 17 is a sectional view taken on line 17—17 of FIG. 9;

FIG. 18 is a sectional view taken on line 18—18 of FIG. 1;

FIG. 19 is a sectional view taken on line 19—19 of FIG. 18;

FIG. 20 is a schematic perspective view of the control system for the aircraft showing the controls in position for helicopter flight mode;

FIG. 21 is a rear perspective view of the movement mixing device employed in the control system of FIG. 20;

FIG. 22 is an exploded perspective view of a universal joint employed in the control system;

FIG. 23 is similar to FIG. 20 showing the controls in position for the airplane flight mode;

FIG. 24 is a perspective view of a portion of the control system in FIGS. 20 and 23 showing the controls in position for transition from one flight mode to the other;

FIG. 25 is a sectional view of a diverter valve taken on line 25—25 of FIG. 3;

FIG. 26 is a bottom view of the diverter valve shown in FIG. 25;

FIG. 27 is a schematic illustration of the collector rings involved in the structure surrounded by line 27 in FIG. 18;

FIG. 28 is a schematic illustration showing a two-position actuator employed in the control system of FIG. 20;

FIG. 29 is a schematic illustration showing a variable position actuator employed in the control system of FIG. 20; and FIG. 30 is a schematic illustration of a programming mechanism employed in the control system of FIG. 20.

Figure 20A:
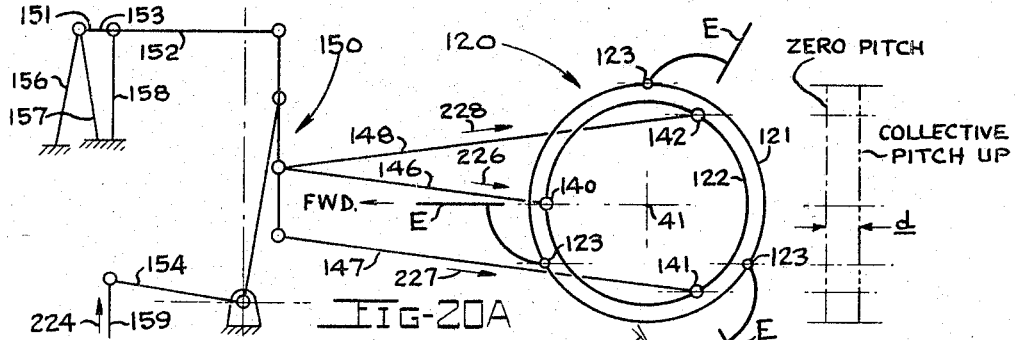
FIGS. 20A, 20B and 20C are diagrammatic illustration of portions of the control system shown in FIG. 20.

The convertiplane-type aircraft shown in FIGS. 1 and 2 and generally identified by reference character A, comprises a fuselage B having a tail section C; and jet-propelled rigid rotor D having an aerodynamic lift-producing hub H supporting aerodynamic thrust-producing blades E; and a jet propulsion system characterized by turbine-type hot-gas generators G and $G^1$ employed as sources of pressurized gas for affecting rotor rotations during the helicopter flight mode and for stopping such rotation, and for producing the propulsive forces required in the airplane flight mode.

Rotor D is rotatably connected to the fuselage B by means of hub H and a large double-acting thrust bearing 40 having an axis of rotation 41 which is vertically arranged with respect to the fuselage. The hub, shown schematically in FIG. 3, is provided with a central axially-projecting load-carrying ring 42 (see FIG. 3A) having a radial circumferential flange forming a circular raceway 43 cooperatively associated with upper and lower sets of rolling elements such as balls 44, and with upper and lower stationary circular raceways 45 and 46 fixedly attached to the top of the fuselage such that axis 41 constitutes the rotation axis of the hub and rotor, and such that the raceways and rolling elements constitute the double-acting thrust bearing 40 which is characterized by capabilities of supporting the fuselage under all flight conditions.

Since the rotor D is a rigid rotor, hub H is provided with a rigid frame characterized by three equally-spaced groups of radially-extending spars 50 and $50^1$ seen in FIGS. 4, 5, 7, 18 and 19, for radially supporting the three thrust-producing blades E in coplanar positions equally spaced around axis 41. Moreover, the rigid frame of the hub is so designed as to support a fairing comprising upper and lower skins 51–52 constructed and arranged to provide the hub with a composite airfoil section and with a symmetrical plan form of suitable area which are selected to provide the necessary aerodynamic lifting forces when the rotor is stationary for air-borne flight at speeds above a preselected minimum during the airplane mode of flight.

The sectional views of blade E in FIGS. 4, 5, and 6 disclose a construction which is typical of all three blades, and according to the drawings each blade is an elongated member of generally rectangular plan form, having an elliptically-shaped uniform airfoil section throughout the length of the blade, which airfoil section is symmetrical fore and aft about the blade spanwise axis 55 (see FIG. 6) such that leading and trailing edges, and upper and lower surfaces provide the blade with the necessary aerodynamic characteristics required for the helicopter and airplane flight modes. The airfoil section of the blades is formed by upper and lower skins 56 and 57 suitably attached to a plurality of elliptically shaped ribs 58 which in turn, are rigidly attached to and supported by a plurality of tubular spars 59 solidly connected at their ends to a transition end portion 61 of an axially-extending tubular member 60 and to a tip-jet portion 80 of the blades as indicated at STAS. B and F, such that the blades are provided with adequate structural strength and rigidity, and such that tubular spars 59 constitute gas-conducting ducts interconnecting member 60 and tip-jet portion 80.

As shown in FIGS. 3 and 4, each member 60 is rotatably supported in bearings 62 and 63 mounted in suitable bearing blocks 64 and 65 disposed between and firmly attached to the outer end portions of spars 50 and $50^1$ by suitable means not shown but such that all blades are radially supported with their spanwise axes in equally-spaced coplanar positions for rotation by the hub in a fixed plane around the vertical axis 41, and such that each blade is permitted angular displacement about its spanwise axis 55 for accommodating desired changes or variations in the pitch of the blade relative to the fixed plane. To facilitate and control this angular displacement, a collar 66 clamped solidly to member 60 is connected by a push rod 67 and ball-and-socket joints $67^1$ and $67^{11}$ to arm $68^1$ of a bell crank 68 pivotally supported in a bracket 69 mounted on spar 50 such that pivotal movement of the bell crank 68 is effective for causing angular movement of member 60 and the blade supported thereby about the spanwise axis 55 of the blade (see FIG. 7).

The jet propulsion system schematically shown with dotted lines in FIG. 1, includes a source of pressurized gas such as the above-mentioned turbine-type gas generators G and $G^1$ which are respectively provided with identical diverter valves 70 and $70^1$ connected to suitable tail pipes terminating in rearwardly-directed thrust-producing nozzles 71 and $71^1$. As indicated in FIG. 1, the diverter valves are provided with elbow portions 72–$72^1$ (see FIG. 25) which are connected by curved ducts 73–$73^1$ to a transition member 74 having a cylindrical upper rim positioned such that its central axis is coincident with axis 41, as shown in FIG. 3.

Gas-conducting passageways interconnecting transition member 74 and tubular members 60 of blades E are provided by ducts 75 and a cylindrical plenum chamber 76 mounted in hub H for rotation therewith around axis 41. A pressure-tight relationship between chamber 76 and transition member 74 is provided by an annular sealing element 77 adapted to sealingly engage the cylindrical walls of the plenum chamber and the transition member so as to permit relative rotation therebetween without gas leakage. Each of the ducts 75 is received by the axially-extending tubular member 60 of each blade such that angular movement of the blade about its spanwise axis 55 is also permitted without gas leakage. Thus, gas-conducting passageways interconnecting tip-jet portions 80 of blades E and generators G and G' are provided by tubular spars 59, axially-extending tubular members 60, ducts 75, plenum chamber 76, transition member 74, curved ducts 73–$73^1$ and diverter valves 70 and $70^1$.

An important feature of the present invention resides in the construction of tip-jet portion 80 of blades E, which is that portion of each blade extending to the left of STA. F as seen in FIG. 4. For purposes of explanation, an enlargement of portion 80 is shown in FIG. 9, where reference numeral 81 identifies a nozzle housing communicating with tubular spars 59, having top and bottom walls 82–$82^1$ (FIG. 5), curved side walls 83–84–89, stationary guide vanes 85–$85^1$ and a movable guide vane 86 for directing pressurized gas from the tubular spars outwardly through thrust-producing openings 87 and 88 such that the outwardly expelled gas is effective for producing the reaction forces required for driving the rotor D.

A fairing 90, normally closing the thrust producing openings 87 and 88, is pivotally mounted in the tip-jet portion 80 to swing outwardly on a pivot pin 91 (FIGS. 12, 13 and 14) from the closing position seen in FIG. 4 to the opening position shown in FIGS. 9 and 10. A suitable spring arrangement such as the telescoping housing 92 containing a compression spring 93 is connected at one end to arms 94 of fairing pivot bracket 95, and at the other end to a stationary bracket 96 attached to wall 83 of nozzle housing 81 for moving the fairing 90 to the closing position. Spring 93 is of a character such that pressurized gas expelled from thrust-producing openings 87 and 88 is capable of moving fairing 90 from the position in FIG. 4 to the position in FIG. 9 where it is held by centrifugal force while the rotor D is rotating in any phase of the helicopter flight mode. Pivot pin 91 is supported in tip portion 80 by suitable brackets 97–$97^1$ which, for the sake of convenience, are shown as being attached to the upper and lower skins 56–57 of the blade (see FIG. 14).

In addition to the means just described whereby pressurized gas is employed for effecting rotor rotation, nozzle housing 81 is also provided with means whereby the same pressurized gas is used for stopping such rotor rotation. This additional means comprises a plurality of passageways defined by top and bottom nozzle housing walls 82–$82^1$, curved side walls 89–98, and stationary guide vanes 99–$99^1$, which passageways terminate in thrust-producing openings 100 located in lower skin 57, as clearly shown in FIGS. 8, 9 and 11, of what would be the leading edge of the blade and its tip-jet portion 80 during rotor rotation. The passageways leading to openings 100 are normally closed by a curved damper 102 which in effect, constitutes a continuation of curved wall 83 that extends to a junction with wall 89. However, when damper 102 is moved from its solid-line position to the position shown in dotted lines, the passageways leading to openings 100 are not only opened to pressurized gas in housing 81, but the passageways leading to openings 87 are closed to such gas. It should also be noted that the passageways leading to openings 88 may be closed to pressurized gas in housing 81 changing the position of movable vane 86 from that shown in solid lines to the position shown in dotted lines.

Movable vane 86 is pivotally mounted on a pin 103 journaled in upper and lower housing walls 82–$82^1$ of housing 81, as shown in FIG. 15; and drivingly connected to the lower end of pin 103 is an arm 104 connected by a link 105 to an arm 106 of an actuating bell crank 107 (FIG. 16) which in turn, is connected to a two-position vane actuator M1 controlled by a pilot-actuated switch S1, hereinafter described, which operates to move the vane to and from the positions shown by solid and dotted lines in FIGS. 4 and 9. Similarly, the curved damper 102 is pivotally mounted for angular movements around a suitable pin such as bolt 108, and the damper is moved to and from the solid and dotted line positions seen in FIGS. 4 and 9 by means of a damper arm 109 (FIG. 17) connected to a two-position damper actuator M2 controlled by a pilot actuated switch S2 of the same construction as actuator M1 and switch S1.

Thus, it should be apparent that, when movable vane 86 and damper 102 are in their solid line positions, all pressurized gas in housing 81 is expelled outwardly through thrust-producing openings 87–88, and that the resultant reaction forces are effective for rotatively driving the rotor such that aircraft A is capable of being operated in the helicopter flight mode. It should also be apparent that, when the vane and damper are in their dotted-line positions, all pressurized gas in housing 81 is expelled outwardly through thrust-producing openings 100 and that the resultant reaction forces are then effective for arresting rotor rotation and for quickly stopping the rotor in preparation for the airplane flight mode without subjecting fuselage B to torsional forces of a character tending to cause counterrotation of the fuselage around vertical axis 41.

When rotor D is stopped, its final at-rest position is that shown in FIG. 1 where one of the blades extends lengthwise of the aircraft with its spanwise axis 55 aligned with the aircraft's longitudinal axis X, and where the other two blades extend laterally, one on the right and one on the left, each at an angle of substantially one hundred twenty degrees with respect to the longitudinally positioned blade, such that the two laterally extending blades can function as ailerons during the airplane mode of flight, as hereinafter explained.

Since the exact position of rotor D, when it is stopped by the forces of jet reaction, is unpredictable, it may be necessary to move the rotor as much as sixty degrees around axis 41 to locate a blade in the position shown in FIG. 1. For this purpose, suitable means schematically illustrated in FIG. 18 are provided, which means comprises a rotor-driving electric motor 110 connected by bevel gears 111 to a tail-rotor drive shaft 112 which in turn, is connected to hub load carrying ring 42 by a driven and driving engagement between gear 113 on one end of shaft 112, and gear teeth T (FIG. 3A) formed on the lower edge of ring 42. Thus, when motor 110 which is preferably a reversible motor is actuated by a pilot-operated reversing switch S0, the motor is effective for rotating the hub incrementally to a correctly aligned position where it is locked by a rotor-locking pin 115 projecting upwardly through the top of fuselage B and lower fairing skin 52 of hub H into a suitable locking plate solidly mounted in the rigid frame of the hub such as a plate 116 rigidly attached to and between each group of radially-extending spars 50–50¹. Pin 115 is moved upwardly into the locking position seen in FIG. 18 and is wtthdrawn downwardly from this position so as to clear the hub when it is rotating, by a two-position rotor-locking actuator M–3 controlled by a pilot-operated rotor-locking switch S–3. Actuator M–3 is of the type employed for moving vane 86 and damper 102, and is hereinafter explained.

Looking at FIGS. 3 and 3A, it will be observed that load-carrying ring 42 of hub H is adapted to slidably receive a swashplate mechanism 120 comprising an outer rotating member 121 drivenly connected to ring 42 by a suitable drag link of the type commonly used for this purpose, but which has been omitted from the drawings for the sake of clarity, and an inner non-rotating member 122 connected to pilot-actuated control elements hereinafter described. As indicated in FIGS. 3, 3A and 18, swashplate mechanism is, in effect, a double row annular ball bearing of which the outer race or rotating member 121 is provided with a spherical outer surface having a diameter such as to permit up and down movements of the washplate mechanism in ring 42, and at the same time permit angular displacement of said mechanism in any direction with the center of the spherical surface on the vertical axis 41. Thus, swashplate mechanism 120 is not only capable of performing the same movements of conventional swashplate mechanisms for causing variations in the pitch angles of blades E both collectively and cyclically during rotor rotation, but it is also effective for causing the two laterally extending blades to function as ailerons when the rotor is locked in position for airplane flight.

Other important features of the present invention reside in the pilot-operated system for actuating the swashplate mechanism for controlling aircraft A during the helicopter and airplane flight modes, and during the periods of transition from one flight mode to the other. In a system of this kind, it is essential, when the rotor is rotating, that changes in the pitch angles of all the blades be made collectively as well as cyclically for accomplishing all the various flight maneuvers required during the helicopter mode of flight; whereas, when the rotor is stopped and locked in the position shown in FIG. 1, it is essential that changes in the pitch angles of the two laterally extending blades be made equally, but in opposite directions to perform the functions of ailerons during the airplane flight mode.

Looking at FIGS. 1 and 2, it will be noted that tail section C is provided with a tail rotor 130, a vertical rudder 131, and horizontal rudders 132 and 133 of conventional design, and that, in the present invention, these elements are made responsive to the pilot-operated control system such that tail rotor 130 and rudder 131 are both effective for horizontal directional control and the horizontal rudders are effective for influencing pitching and rolling movements of the aircraft during flight in the helicopter mode, and such that when the aircraft is operating in the airplane flight mode, horizontal directional control is effected by the vertical rudder only, and the control of pitching movements is effected solely by horizontal rudders 132 and 133 which also operate to augment the aileron function of the two laterally extending blades for controlling the rolling movements in airplane flight.

The pilot-operated system for actuating swashplate mechanism 120, tail rotor 130, vertical rudder 131, and horizontal rudders 132–133, is illustrated in FIG. 20, where the inner non-rotating member 122 of the swashplate mechanism is shown schematically in perspective in the proper relationship with respect to the vertical axis 41 of the rotor hub. The previously mentioned up-and-down movements and the angular displacement of the swashplate mechanism relative to the vertical axis 41, for collectively and cyclically effecting changes in the pitch of blades E, results from movements transmitted to non-rotating member 122 of said swashplate mechanism by push rods 140, 141, 142, triangular-shaped bell cranks 143, 144, 145, and push rods 146, 147, 148 respectively connected to bell cranks 151, 152, 153 of a movement mixing device 150, as indicated by arrows 146¹, 147¹, 148¹ seen in FIGS. 20, 21 and 23.

Movement-mixing device 150 is provided with a master bell crank 154 fulcrumed in a stationary bracket 155 suitably attached to the frame of fuselage B. The upwardly-extending vertical arm of bell crank 154 is bifurcated and pivotally supports the fulcrum of bell crank 152 such that its vertical arm extends downwardly between the two branches of the bifurcated arm of the master bell crank for a suitable connection (not shown) with push rod 147 as indicated by arrow 147¹. Bell crank 152 is a compound bell crank having an upwardly extending portion which pivotally supports the fulcrums of bell cranks 151 and 153 such that the vertical arms thereof extend downwardly on opposite side of the bifurcated arm of the master bell crank 154 for suitable connections with push rods 146 and 148 as indicated by arrows 146¹ and 148¹.

A triangular-shaped compound bell crank 160 having horizontal arms 161 and 162 is fulcrumed midway between the ends of said arms by means of a universal joint 163 connected to the lower end of a shaft 164 supported on the frame of fuselage B by suitable means (not shown), for angular movement about a vertical axis 166 such that a quarter turn of shaft 164 in a clockwise direction will change the attitude of bell crank 160 from parallel alignment with the longitudinal axis X of aircraft A to an attitude of parallel alignment with the lateral axis Y of the aircraft, according to FIG. 23.

As indicated in the exploded view shown in FIG. 22, universal joint 163 is a conventional design in which the lower end of shaft 164 and the upper side of bell crank 160 are constructed to receive a pivot block 167 such that said block is pivotally supported by shaft 164 for movement about axis 168, and bell crank 160 is pivotally supported by block 167 for movement about axis 169 disposed at right angles to axis 168.

Now, it can be seen in FIG. 20 that the ends of horizontal arms 161 and 162 are respectively connected to the horizontal arms of bell cranks 152 and 153 by push rods 156 and 157; hence, any rocking movement of bell crank 160 about axis 168 is transmitted through rods 156 and 157 to bell cranks 151 and 153 of mixing device 150. However, because of the construction of universal joint 163, bell crank 160 is movable about axis 169 without imparting any movement of bell cranks 151 and 153 for reasons hereinafter explained.

A triangular-shaped bell crank 170 is fulcrumed by means of a universal joint 173 connected to the lower end of a shaft 174 supported on the frame of fuselage B by suitable means (not shown) for angular movement about a vertical axis 176 such that a quarter turn of shaft 174 in a counter-clockwise direction will change the attitude of bell crank 170 from parallel alignment with the longitudinal axis X of aircraft A to an attitude of parallel alignment with lateral axis Y of the aircraft, as shown in FIG. 23. Universal joint 173 is of the same design as universal joint 163 previously described in connection with FIG. 22; hence, the lower end of shaft 174 and the upper side of bell crank 170 are constructed to receive pivot block 167 such that said block is pivotally supported by shaft 174 for movement about axis 168; and bell crank 170 is pivotally supported by block 167 for movement about axis 169 disposed at right angles to axis 168. Observing FIG. 20, it can be seen that the horizontal arm of bell crank 170 is connected to the horizontal arm of bell crank 152 by a push rod 158; hence, any movement of bell crank 170 about axis 168 is transmitted through rod 158 to bell crank 152 of mixing device 150. In view of the similarity between universal joints 173 and 163, bell crank 170 like bell crank 160 is movable about axis 169 without imparting any movement to bell crank 152.

Another triangular-shaped bell crank 180 is fulcrumed in a universal joint 183 connected to the lower end of a shaft 184 supported on the frame of fuselage B by suitable means (not shown) for angular movement about a vertical axis 186 such that a quarter turn of shaft 184 in a clockwise direction will change the attitude of bell crank 180 from parallel alignment with the longitudinal axis X of aircraft A to an attitude of parallel alignment with lateral axis Y of the aircraft, as shown in FIG. 23. The design of universal joint 183 is the same as universal joint 163 disclosed in FIG. 22; hence the lower end of shaft 184 and the upper side of bell crank 170 are constructed to receive pivot block 167 such that said block is pivotally supported by shaft 184 for movement about axis 168, and bell crank 180 is pivotally supported by block 167 for movement about axis 169 disposed at right angles to axis 168. Looking at FIG. 20, it will be noted that the horizontal arm of bell crank 180 is connected to the horizontal arm of master bell crank 154 by a push rod 159; hence, any movement of bell crank 180 about axis 168 is transmitted through rod 159 to the master bell crank 154. However, because of the structural similarity between universal joints 183 and 163, bell crank 180 is also movable like bell cranks 160 and 170 about axis 169 without causing any movement of the master bell crank. As noted above, the reasons for this arrangement will be hereinafter explained.

A pilot-actuated control lever 200 pivotally mounted in a conventional fixture 201 for longitudinal and lateral movements respectively indicated by arrows 202, 202$^1$, 203 and 203$^1$ is connected at its lower end to horizontal rudders 132 and 133 by means of a push rod 204, crosspiece 206 of a movement-mixing device 205, and push rods 134 and 135 interconnecting said crosspiece and horizontal rudders, whereby longitudinal movement of control lever 200 causes movement of mixing device 205 about its lateral axis 207 such that movement of lever 200 in the direction indicated by arrow 202 is effective for causing movement of horizontal rudders 132 and 133 concurrently about their pivotal axes in the directions indicated by arrows 136 and 137, and such that movement of said lever 200 in the direction indicated by arrow 202$^1$ is effective for causing similar movement of the horizontal rudders in the opposite directions as indicated by arrows 136$^1$ and 137$^1$.

Fixture 201 is provided with a downwardly extending arm 210 which is connected to an arm 208 of movement mixing device 205 by means of a push rod 211, a bell crank 212, and a push rod 213, whereby lateral movement of control lever 200 is effective for causing angular movement of mixing device 205 and its crosspiece 206 about vertical axis 209 such that movement of lever 200 in the direction indicated by arrow 203 is effective for causing concurrent movements of rudders 132 and 133 about their axes in the directions respectively indicated by arrows 136$^1$ and 137, and such that movement of the lever 200 in the direction indicated by arrow 203$^1$ is effective for causing concurrent movements of rudders 132 and 133 about their axes in the directions respectively indicated by arrows 136 and 137$^1$.

Longitudinal movements of control lever 200, as indicated by arrows 202 and 202$^1$, are transmitted to bell crank 160 by means of a transfer lever 214 connected at one end to push rod 204, and a push rod 215 connected between the other end of the transfer lever and a suitable joint 216 located at the lower end of the downwardly extending vertical arm of bell crank 160; whereas, the lateral movements of control lever 200, as indicated by arrows 203 and 203$^1$ are transmitted to bell crank 170 by means of a push rod 217 connected between bell crank 212 and a suitable joint 218 located at the lower end of the downwardly extending vertical arm of bell crank 170.

A second pilot actuated control lever 220, pivotally associated with the frame of fuselage B, is interconnected with bell crank 180 by means of a push rod 221 connected at one end to said lever and at the other end to a suitable joint 222 located at the lower end of the downwardly extending vertical arm of the bell crank 180 such that movement of lever 220 in the directions indicated by arrows 223 and 223$^1$ are transmitted to master bell crank 154 through bell crank 180.

From the foregoing descriptions of the pilot actuated control levers and their connections to the bell cranks of the movement-mixing device 150, it should now be apparent that control levers 200 and 220 are not only effective for causing up-and-down movements of the horizontal arms of bell cranks 151, 152, 153 and 154, but they are also effective for holding said bell crank arms in any particular positions according to requirements as determined by the pilot.

When control lever 200 is held by the pilot in the position shown in FIG. 20, and control lever 220 is moved in the direction indicated by arrow 223, push rod 159 moves upwardly according to arrow 224, causing angular displacement of master bell crank 154 about its fulcrum in a clockwise direction which in turn, imparts similar movements to the fulcrums of bell cranks 151, 152 and 153. However, since the horizontal arms of these bell cranks are restrained from moving up or down by control lever 200 acting through push rods 156, 157 and 158, the effect of the clockwise movement of the master bell crank is to cause movements of push rods 146, 147 and 148 in the directions indicated by arrows 226, 227 and 228. And, since the nonrotating member 122 of swashplate mechanism 120 is connected to push rods 146, 147 and 148 as previously described, movements of said push rods all in the same directions according to arrows 226, 227 and 228 are effective for causing the swashplate mechanism to move upwardly in ring 42 in a direction aligned with the vertical axis 41 of the hub, as indicated by arrow 126, FIG. 20.

In the description of swashplate mechanism 120, it was indicated that up and down movements and angular displacements of said mechanism relative to vertical axis 41 are effective for causing variations in the pitch angles of blades E. These results (see FIGS. 18 and 19) are accomplished for each blade by a push rod 123 interconnecting rotating member 121 of swashplate mechanism 120 and the horizontal arm of bell crank 124, and by another push rod 125 interconnecting the vertical arm of bell crank 124 and arm $68^{11}$ of bell crank 68 (FIGS. 4 and 7). Thus when control lever 200 is held in a neutral position as shown in FIG. 20 and control lever 220 is moved in the direction of arrow 223, the result is an upward movement of swashplate mechanism 120 in the direction indicated by arrow 126, which movement not only effects changes in the pitch angles of all three blades about their spanwise axes simultaneously, i.e., collectively, but such changes are of equal magnitude in the same direction. This result is clearly illustrated in FIG. 20A where swashplate mechanism has moved upwardly a preselected distance $d$ from the zero pitch line to the collective pitch line such that blades E shown schematically connected to member 121 of the swashplate mechanism are angularly displaced about their spanwise axes for producing the lifting forces essential to vertical flight when the aircraft is operating in the helicopter flight mode.

Figure 20B:
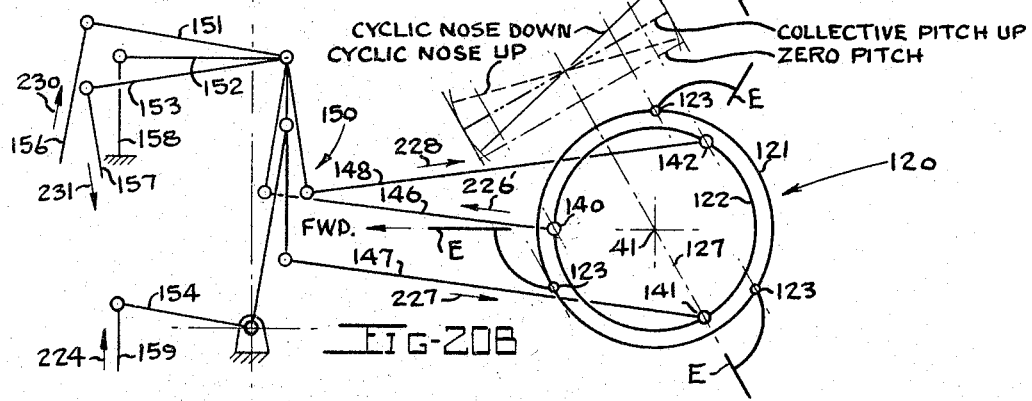
Figure 20C:
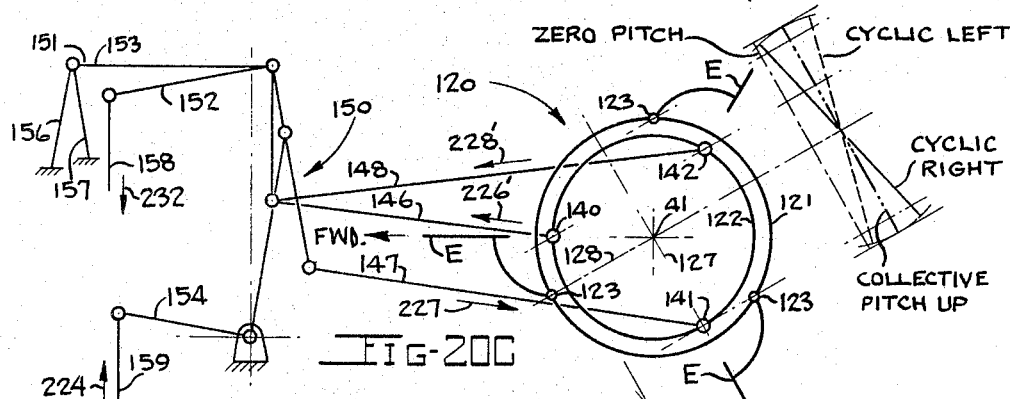

Once the pitch angles of blades E have been adjusted collectively for vertical flight as above described, horizontal flight is achieved by tilting the swashplate mechanism such that the pitch angles of the blades are cyclically varied. This cyclic variation is effected through movement mixing device 150 by pilot manipulation of control levers 200 and 220. For example, by holding collective pitch control lever 220 in a particular position for the desired collective pitch, the pilot causes master bell crank 154 to assume a fixed attitude; thus, when pilot-actuated lever 200 is moved in the direction indicated by arrow 202, bell crank 160 is angularly displaced about its fulcrum such that push rods 156 and 157 move upwardly and downwardly in the directions indicated by arrows 230 and 231, respectively (see FIGS. 20 and 20B), which in turn, causes bell cranks 151 and 153 to move about their fulcrums on bell crank 152 such that push rods 146 and 148 move in directions indicated by arrows $226^1$ and 228 to the extent that push rods 140 and 142 are respectively moved down and up from their collective pitch positions established by pilot-manipulation of control lever 220. Now, since the movement of control lever 200 according to arrow 202 is such that fixture 201 remains stationary, there is no movement imparted to bell cranks 170 and 152 by control lever 200, hence push rods 147 and 141 remain fixed in the position established by control lever 220. The fixed attitude of push rod 141 and the down and up movements of push rods 140 and 142 cause swashplate mechanism 120 to tilt about a horizontal axis 127 (FIGS. 19 and 20) intersecting vertical axis 41 and substantially aligned with the connection between push rod 141 and non-rotating swashplate member 121. This tilting of the swashplate mechanism, clearly illustrated in FIG. 20B, produces cyclical variations in the pitch angles of blades E during rotation of rotor D for effecting the nose-down attitude essential to forward flight when the aircraft is operating in the helicopter flight mode. Conversely, when collective pitch control lever 220 is held as above described, and cyclical pitch control lever 200 is moved in the direction of arrow $202^1$, movements of the active bell cranks and push rods are reversed and swashplate mechanism 120 is tilted about axis 127 in the opposite direction which in turn, produces cyclic variations in the pitch angles of blades E such that a nose-up attitude of aircraft A is effected when the same is operating as a helicopter. This opposite tilt of the swashplate mechanism which is essential to backward helicopter flight, is shown in FIG. 20B where the solid and dotted lines identified by legends "cyclic nose down" and "cyclic nose up" represent the forward and backward tilt of the swashplate mechanism about horizontal axis 127.

The above-described tilting of swashplate mechanism 120 relative to axis 127 is accompanied by concurrent movements of horizontal rudders 132 and 133. For instance, when control lever 200 is moved according to arrow 202, horizontal rudders move downwardly as indicated by arrows 136 and 137, and when the movement of lever 200 is in the direction of arrow $202^1$ said rudders move upwardly according to arrows $136^1$ and $137^1$. Thus, cyclic variations in the pitch angles of blades E for effecting nose-down or nose-up attitudes of the aircraft are augmented by aerodynamic forces resulting from down or up positions of the horizontal rudders during flight in the helicopter flight mode.

Sideward movement of aircraft A when operating as a helicopter, is effected by pilot-manipulation of control levers 200 and 220. For example, by holding lever 220 in a particular position for the required collective pitch essential to vertical flight, the pilot causes master bell crank 154 to assume a fixed attitude; thus, when pilot-actuated lever 200 is moved in the direction indicated by arrow 203 bell crank 170 is angularly displaced about its fulcrum such that push rod 158 moves downwardly as shown by arrow 232, which in turn, causes bell crank 152 to move counterclockwise about its fulcrum on the vertical arm of the master bell crank such that push rod 147 moves as indicated by arrow 227 causing push rod 141 to move upwardly from its collective pitch position established by control lever 220 (see FIG. 20C). Inasmuch as the movement of control lever 200 in the direction indicated by arrow 203 is such that no movement is imparted to bell cranks 151 and 153 by bell crank 160, it follows that the attitudes of these bell cranks remain fixed; hence, the counterclockwise movement of bell crank 152 about its fulcrum on bell crank 154 will cause push rods 146 and 148 to move as indicated by arrows $226^1$ and $228^1$ such that push rods 140 and 142 move downwardly from their collective pitch position established by control lever 220. The upward movement of push rod 141 and the downward movements of push rods 140 and 142 cause swashplate mechanism 120 to tilt about a horizontal axis 128 (FIGS. 19 and 20) intersecting vertical axis 41 at right angles to axis 127. This tilting of the swashplate mechanism clearly illustrated in FIG. 20C, produces cyclic variations in the pitch angles of blades E during rotation of rotor D such that the aircraft moves sideward to the right. Conversely, when collective pitch control lever 220 is held as above described, and cyclical pitch control lever 200 is moved as indicated by arrow $203^1$, movements of the active bell cranks and push rods are reversed such that swashplate mechanism 120 is tilted about axis 128 in the opposite direction which in turn, produces cyclic variations in the pitch angles of blades E during rotor rotation such that the aircraft moves sideward to the left. This opposite tilt of the swashplate mechanism is clearly shown in FIG. 20C where the solid and dotted lines identified by legends "cyclic right" and "cyclic left" represent the right and left tilt of the swashplate mechanism about horizontal axis 128.

The above-described tilting of swashplate mechanism 120 relative to axis 128 is accompanied by concurrent differential movements of horizontal rudders 132 and 133. In other words, when cyclical pitch control lever 200 is moved as shown by arrow 203, push rod 213 actuates movement mixing device 205 such that rudders 132 and 133 respectively move in the directions indicated by arrows 136$^1$ and 137, and when lever 200 is moved as shown by arrow 203$^1$, rudders 132 and 133 move in the opposite directions according to arrows 136 and 137$^1$. Thus, the effects of cyclic variations for causing movement of the aircraft to the right or left are augmented by aerodynamic forces resulting from the differentially moved horizontal rudders during forward flight of aircraft A in the helicopter flight mode.

Tail rotor 130 drivenly connected to tail rotor drive shaft 112 as indicated by dashed line 138 (FIG. 20), is of conventional design and is coupled to pilot-actuated rudder pedals 233 and 234 by push rod 235, transfer lever 236, push rod 237, vertical rudder bell crank 238, and push rod 239 for turning the aircraft to any desired heading and for maintaining such heading during helicopter flight. It should also be noted that movement of bell crank 238 by pedals 233 and 234 effects corresponding movement of vertical rudder 131; hence, in forward flight, movement of the vertical rudder to the right or left will result in aerodynamic forces of a character tending to assist the tail rotor in maintaining the desired heading of the aircraft.

From the foregoing description of the pilot-actuated control system, it should be evident that cyclical pitch control lever 200, collective pitch control lever 220, and rudder pedals 233 and 234 are completely effective for controlling both the altitude and the attitude of aircraft A, as well as its directional heading, during its operation in the helicopter mode of flight.

In the airplane flight mode, rigid rotor D is in a stationary condition as shown in FIGS. 1, 2 and 18 where collective and cyclical changes in the pitch angles of all of the blades E are not only unnecessary, but such change must be prevented. Therefore, the abilities of the cyclical and collective pitch control levers to perform their normal functions essential to the helicopter mode of flight are necessarily neutralized when the aircraft is operated in the airplane flight mode. This is accomplished by rotating shafts 164, 174 and 184 one quarter turn as previously mentioned, such that bell cranks 160, 170 and 180 are aligned substantially parallel with lateral axis Y of the aircraft according to the showing in FIGS. 23 and 24. When aligned in this manner, bell cranks 160, 170 and 180 are movable about axis 169 of their respective universal joints 163, 173 and 183 without imparting any movement to bell cranks 151, 153, 152 and 154 of movement-mixing device 150. Thus, any movements of push rods 215 and 217 resulting from movement of cyclical pitch control lever 200 are ineffective for tilting swash plate mechanism 120. Similarly, any movement of push rod 221 by collective pitch control lever 220 is ineffective for causing the swash plate mechanism to move upwardly the distance $d$ to the collective pitch position as illustrated in FIG. 20A. Observing FIGS. 20, 23 and 24, it will be noted that two-position actuators M4, M5 and M6 are connected to shafts 164, 174 and 184 by arms 165, 175 and 185 for effecting the quarter-turn movements of said shafts in response to a pilot-actuated control switch S4. The above-identified actuators are of the same design as actuator M1 described later.

It was previously indicated that swash plate mechanism 120 is responsive to pilot-actuated controls for causing the two laterally-extending blades of the stationary rotor seen in FIG. 1, to function as ailerons when the aircraft is operating in the airplane flight mode. In other words, the swash plate mechanism must be actuated such that the pitch angles of the two laterally-extending blades are varied differentially without imparting any pitch-changing movements to the longitudinally-extending blade. These results are accomplished by means responsive to movements of cyclical pitch control lever 200 in the directions of arrows 203 and 203$^1$. In looking at FIGS. 20, 23 and 24, it will be noted that a triangular-shaped bell crank 190 is fulcrumed by means of a universal joint 193 connected to one end of a shaft 194 supported on the frame of fuselage B by suitable means (not shown) for angular movement about a horizontal axis 196 arranged substantially parallel with lateral axis Y of the aircraft, such that a quarter turn of shaft 194 in a counterclockwise direction will change bell crank 190 from its horizontal attitude seen in FIGS. 20 and 24, to the vertical attitude seen in FIG. 23. The design of universal joint 193 is the same as joint 163 described in connection with FIG. 22; hence, the one end of shaft 194 and one side of bell crank 190 are constructed to receive pivot block 167 such that said block is pivotally supported by shaft 194 for movement about axis 168, and bell crank 190 is pivotally supported by block 167 for movement about axis 169 disposed at right angles to axis 168. According to FIG. 23, the vertical arm of bell crank 190 is connected to joint 222 of bell crank 180 by a push rod 191, and the lateral arm of bell crank 190 is connected to push rod 217 by bell crank 218, push rod 219, bell crank 197 and push rod 192. Thus, any movements of cyclical pitch control lever 200 in the directions of arrows 203 and 203$^1$ are transmitted to master bell crank 154 of movement-mixing device 150 via bell crank 180 and push rod 159.

Another triangular-shaped bell crank 240 is fulcrumed in a universal joint 243 connected to one end of a shaft 244 supported on the frame of fuselage B by suitable means (not shown) for angular movement about a horizontal axis 246 arranged substantially parallel with lateral axis Y of aircraft A, such that a quarter turn of shaft 244 in a counterclockwise direction will change bell crank 240 from its horizontal attitude in FIGS. 20 and 24 to the vertical attitude seen in FIG. 23. Inasmuch as the design of universal joint 243 is the same as joint 163, the one end of shaft 244 and one side of bell crank 240 are constructed to receive pivot block 167 such that this block is pivotally supported by shaft 244 for movement about axis 168, and bell crank 240 is pivotally supported by block 167 for movement about axis 169 disposed at right angles to axis 168 all as shown in FIG. 22. It can be seen in FIG. 23 that the vertical arm of bell crank 240 is connected to joint 216 of bell crank 160 by a push rod 241, and that the lateral arm of bell crank 240 is connected to push rod 219 by bell crank 247, push rod 248, bell crank 249 and push rod 242. Thus, any movements of cyclical pitch control lever 200 in the direction of arrows 203 and 203$^1$ are transmitted to bell cranks 151 and 153 of movement-mixing device 150 through bell crank 160 and push rods 156 and 157. Two-position actuators M7 and M8 of the same design as M1 through M6, are connected to shafts 194 and 244 by arms 195 and 245 for effecting the quarter-turn movements of said shafts in response to a pilot-actuated control switch S5. However, it should be noted that when shafts 194 and 244 are positioned as shown in FIGS. 20 and 24 where the attitudes of bell cranks 190 and 240 are horizontal, movements of lever 200 according to arrows 203 and 203$^1$ are ineffective for moving bell cranks 160 and 180 because of the construction of universal joints 193 and 243, which permits movements of bell cranks 190 and 240 about axis 169 of said joints without imparting any movement to bell cranks 160 and 180.

Figure 23A:
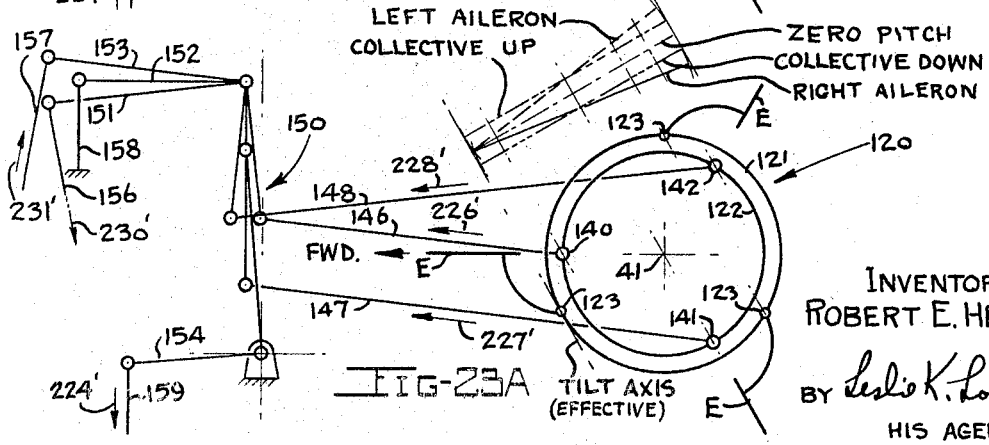
FIG. 23A is a diagrammatic illustration of portions of the control system shown in FIG. 23.

When bell cranks 160, 170, 180, 190 and 240 are positioned as illustrated in FIG. 23, movement of cyclic pitch control lever 200 in the direction of arrow 203 is transmitted, as above described, to bell crank 180 such that push rod 159 moves downwardly according to arrow 224$^1$, thereby causing master bell crank 154 to move counterclockwise about its fulcrum. As previously noted, bell cranks 151 and 153 are fulcrumed on bell crank 152 which is pivotally supported in the upwardly-extending bifurcated arm of bell crank 154 and, since universal joint 173 of bell crank 170 is constructed such that lateral movements of control lever 200 are ineffective for moving bell crank 152, the attitude of the latter bell crank remains fixed to an extent that the effect of the counterclockwise movement of bell crank 154 is to move bell crank 152 to the left such that bell cranks 151 and 153 are also moved to the left and push rod 147 is moved as indicated by arrow 227[1]. Now, if the attitudes of bell cranks 151 and 153 remained fixed like bell crank 151, the end result of the counterclockwise movement of bell crank 154 would be collective downward movement of push rods 140, 141 and 142 and a consequent downward movement of swash plate mechanism 120, which would in turn, cause corresponding changes in the pitch angles of blade E collectively. However, it is important to note that movements of push rod 159 and bell crank 154 in response to lateral movement of control lever 200 are accompanied by concurrent downward and upward movements of push rods 156 and 157 as indicated by arrows 230[1] and 231[1]; hence, the attitudes of bell cranks 151 and 153 do not remain fixed because they are moved by push rods 156 and 157 such that push rod 148 moves in the direction of arrow 228[1] a greater distance than push rod 147, and push rod 146 moves according to arrow 226[1] a distance less than push rod 147 (see FIG. 23A). The results of the different degrees of movement of push rods 146, 147 and 148 are downward movements of push rods 140, 141 and 142 of a character causing swash plate mechanism to tilt such that the forwardly extending blade is maintained by zero pitch while the pitch angles of the two rearwardly-extending blades are differentially adjusted so as to function as ailerons for causing aircraft A to roll to the right about its longitudinal axis X during flight in the airplane mode. Movement of cyclic pitch control lever 200 in the direction indicated by arrow 203[1] will reverse the movements of bell cranks 151, 152, 153 and 154 and cause swash plate mechanism 120 to tilt in the opposite direction such that the rearwardly-extending blades are differentially adjusted so as to function as ailerons for causing the aircraft to roll to the left. The above-described actions of movement mixing device 150 and the swash plate mechanism are clearly illustrated in FIG. 23A where the different positions of the swash plate mechanism are identified by appropriate legends, and where the apparent axis of swash plate tilt is shown as intersecting the connection between rotating member 121 of said swash plate and the pitch-changing push rod 123 (see FIG. 18) of the forward blade.

Operation of the rearwardly-extending blades as ailerons in response to lateral movements of control lever 200 is accompanied by differential movements of horizontal rudders 132 and 133, which occur as a result of the movements imparted to push rod 213 by said control lever. Thus, the aero-dynamic forces resulting from the differentially-positioned laterally-extending blades are augmented by similar aerodynamic forces resulting from the differentially-positioned rudders 132 and 133 in the airplane mode of flight.

Inasmuch as tail rotor 130 is driven by rigid rotor D in the manner previously explained, it is evident that in the airplane flight mode directional control of the aircraft is effected solely by vertical rubber 131 through pilot-manipulation of rudder pedals 233 and 234. Moreover, the passageway through vertical fin 129 in which the tail rotor is mounted (see FIG. 2), is provided with suitable shutters 130[1] on each side of the fin arranged such that the passageway can be closed on both sides when the aircraft is operating in the airplane flight mode, and open during operation in the helicopter mode of flight.

A two-position actuator M representative of the previously mentioned actuators M1 through M8, is schematically illustrated in FIG. 28 where according to the drawing, a worm gear 251 having an internally threaded bore is mounted on a threaded push rod 252 slidably supported against rotary movement in a suitable housing 253 such that rotation of gear 251 is effective for causing the push rod to move in either direction indicated by arrows 254 and 254[1] in response to rotation of worm 255 drivenly connected to an electric motor 256. A reversing relay 260 having three sets of contacts 261, 262 and 263, is arranged for connection by a pilot-actuated switch S, representative of switches S1 through S5, to an electrical energy source 264, whereby movement of the switch to the left of the center position will energize relay 260 and actuate the three sets of contacts such that a condition is established in which energy from source 264 is effective for causing motor 256 to rotate, e.g., in a counterclockwise direction; and whereby movement of switch S to the right of center will reverse the action of the relay and cause the motor to rotate in a clockwise direction. Since actuator M is a two-position actuator, limit switches 265 and 266 responsive to movement of push rod 252 are provided for automatically opening the motor-energizing circuit when the push rod has moved a predetermined distance in either direction. Reversible motors, relays and limit switches of the above character are well-known in the art.

In the transition from helicopter flight to airplane flight, rotor D passes through a decelerating stage and the forces of lift are gradually transferred from thrust-producing blades E to the lift-producing airfoil-shaped hub H; hence, it is essential that the pitch angles of all blades be adjusted collectively and/or cyclically to minimize rotor oscillation and to avoid loss of lift caused by changing aerodynamic conditions that accompany rotor deceleration. Conversely, in the transition from airplane flight to helicopter flight, rotor D is accelerating and the forces of lift are transferred gradually from hub H to thrust-producing blades E; hence, it is again necessary to effect changes iin the pitch angles of the blades to avoid any undesirable change in the flight attitude of the aircraft as the blades take over the lift-producing function from the airfoil-shaped hub.

When bell cranks 160, 170 and 180 are positioned as shown in FIG. 20 during transition from one flight mode to the other, cyclic and collective pitch control levers can be manipulated by the pilot such that suitable changes in the pitch angles of blades E will occur at the right moment to prevent loss of lift and changes in the attitude of the aircraft resulting from velocity changes in rotor rotation. However, to avoid errors in pilot judgment, the present invention provides means responsive to rotational velocity of rotor D, whereby required changes in the pitch angles of blades E are made automatically during the shift from one mode of flight to the other such that substantially constant lift is maintained by the rotor as it changes from a rotating condition to a stationary condition, and vice versa. These automatic adjustments of the blade pitch angles are accomplished by variable-position actuators N1, N2 and N3 cooperatively associated with a programming mechanism 300, seen in FIGS. 20 and 23.

A variable-position actuator N representative of actuators N1, N2 and N3, is schematically shown in FIG. 29, where reference numeral 270 identifies a worm gear having an internally threaded bore mounted on a threaded push rod 271 slidably supported against rotary movement in a suitable housing 272 such that rotation of worm gear 270 is effective for causing push rod 271 to move in either direction indicated by arrows 273 and 273[1] in response to rotation of worm 274 drivenly connected to an electric motor 275. A reversing relay 276 having two sets of contacts 277 and 278, is connected to a phase-sensitive electronic amplifier 279 provided with input and output circuits of a character such that an input voltage flowing in one direction is amplified to provide an output voltage flowing in a corresponding direction, and such that a reversal in the direction of the input voltage will result in a reversal of the output voltage. Thus, amplifier 279 is, in effect, a double-throw switch for energizing relay 276 and actuating the two sets of contacts 277 and 278 such that motor 275 is caused to rotate clockwise or counterclockwise depending upon the direction of the voltage flowing through the input circuit of the amplifier. A position potentiometer 280 adapted for connection in a bridge circuit to be explained later, is provided with a sliding arm 281 associated with amplifier 279 and push rod 271 such that arm 281 constitutes one of two input connections to the amplifier, and such that movement of the push rod is effective for causing corresponding movement of said arm to the extent that the position of the arm is representative of the position of the push rod. Reversible motors, relays and amplifiers of the above character are well-known in the art.

As illustrated in FIG. 20, variable-position actuators N1, N2 and N3 are respectively connected to bell crank 240 at joint 250, to bell crank 170 at joint 218, and to bell crank 190 at joint 198. Thus, when bell cranks 190 and 240 are disposed in their horizontal positions, and bell cranks 160, 170 and 180 have been rotated one quarter turn to their lateral positions all as shown in FIG. 24, movements of actuators N1, N2 and N3 being equivalent in effect to movements of manually operated collective and cyclical control levers 220 and 200, are effective for causing movements of bell cranks 151, 153, 152 and 154 which in turn, causes corresponding movements of push rods 140, 141 and 142 such that swash plate mechanism 120 moves vertically and/or tilts accordingly. It should be noted that, when bell cranks 160, 170, 180, 190 and 240 are positioned as shown in FIG. 20, movements of the variable-position actuators are ineffective for causing any movements of the swash plate mechanism by way of movements imparted to the bell cranks 160, 170 and 180, because of the neutralizing action of universal joints 163, 173 and 183. However, it is also important to note that when actuators N1, N2 and N3 are inactive or in stationary conditions, they serve as means for steadying bell cranks 160, 170 and 180 during their movement by pilot-actuated cyclic and collective pitch control levers 200 and 220, while the aircraft is operated in the helicopter flight mode. The steadying action just described also applies in FIG. 23, where actuators N1 and N3 operate to steady bell cranks 240 and 190 during their movement by cyclic pitch control lever 200, and the actuator N2 serves to hold bell crank 170 such that the fixed attitude of bell crank 152 previously described in connection with FIG. 23A is effected and maintained, while the aircraft is operated in the airplane flight mode.

The programming mechanism 300 schematically illustrated in FIG. 30, is provided with a speed-sensing device such as governor 301; six potentiometers 304, 305, 306, 307, 308 and 309; and a double-acting relay 310 having nine sets of contacts in which each set is characterized by a movable contact and two stationary contacts arranged such that the movable contact is effective for alternate conductive engagement with the two stationary contacts. Governor 301 is drivenly connected to rotor D by means of a flexible shaft 302 connected to the armature of motor 110 as indicated in FIGS. 20 and 23, and the speed-responsive faculties of the governor are transmitted by a lever 303 as actuating forces to sliding arms $304^1$, $305^1$, $306^1$, $307^1$, $308^1$ and $309^1$. In six of the sets of contacts identified by numerals 311, 313, 314, 316, 317 and 319 the stationary contacts are connected to potentiometers 304 through 309, and in the other three sets identified by numerals 312, 315 and 318 the stationary contacts are connected to sliding arms $304^1$ through $309^1$.

The above described connections of the different potentiometers to the different sets of contacts are clearly shown in the diagram of FIG. 30 where it can also be seen that variable actuators N1, N2 and N3 are electrically connected to the programming mechanism such that in the case of actuator N1, potentiometer 280 is connected to the movable contacts of contact sets 311 and 313, and the other input of amplifier 279 is connected to the movable contact of set 312; whereas in the case of actuator N2, potentiometer 280 is connected to the movable contacts of sets 314 and 316, and the other input of amplifier 279 is connected to the movable contact of set 315; while in the case of actuator N3, potentiometer 280 is connected to the movable contacts of contact sets 317 and 319, with the other input connection of amplifier 279 going to the movable contact of set 318.

A pilot-actuated switch S6 having positions marked ACC. and DEC. which designate the acceleration and deceleration stages of rotor D rotation, is arranged for connecting relay 310 to electrical energy source 264 such that movement of the switch from its central position to the position marked ACC. will activate the relay and cause the movable contact to conductively engage the upper stationary contact in each of the nine sets of contacts 311 through 319, and such that movement of switch S6 to the position marked DEC. will cause the movable contact to conductively engage the lower stationary contact in each of the nine sets. In looking at FIG. 30, it can be seen that when switch S6 is in the ACC. position, the resistance elements in potentiometers 304, 306 and 308 and the resistance elements in potentiometers 280 of actuators N1, N2 and N3 are connected in series-parallel arrangements with energy source 264 so as to constitute three discrete acceleration bridge circuits in which sliding arms $304^1$, $306^1$ and $308^1$ of their respective potentiometers and sliding arms 281 of potentiometers 280 in the above-named actuators constitute means supplying input voltages from the acceleration bridge circuits to the amplifiers 279 of said actuators. Conversely, when switch S6 is in the DEC. position, the resistance elements in potentiometers 304, 306 and 308 are replaced with the resistance elements in potentiometers 305, 307 and 309 for changing the acceleration bridge circuits into three deceleration bridge circuits for supplying input voltages to the three variable-actuator amplifiers 279 through sliding arms $305^1$, $307^1$, $309^1$ and arms 281 of potentiometers 280 of the variable actuators.

Since the thrust-producing ability of rotor D is related to its velocity of rotation and the pitch angles of blades E; and in view of the functional relationship between programming mechanism 300 and variable actuators N1, N2 and N3; and because of the blade-pitch-changing ability of said actuators; it should be evident that by selecting suitable resistance elements for potentiometers 304 through 309 and for the potentiometers 280 in each of the variable actuators, the pitch angles of blades E are subjected to continuous adjustment collectively and/or cyclically with respect to rotation velocity of rotor D such that optimum lift and balanced flight are automatically achieved in both the decelerating and accelerating stages of rotor rotation. This is so, because the decelerating and accelerating bridge circuits supply the necessary information to the amplifiers of the variable actuators which in turn, effect appropriate changes in the pitch angles of the blades according to said information. Moreover, the accelerating and decelerating bridge circuits are so constructed that when rotor D is stopped and switch S6 in the ACC. or DEC. position, voltages are supplied to amplifiers 279 of actuators N1, N2 and N3 until said actuators have not only adjusted the pitch angles of blades E to a condition of zero pitch, but they have also adjusted the positions of sliding arms 281 of the particular bridge circuits involved until the voltages supplied to said amplifiers have diminished substantially to zero which in turn, deenergizes relays 276 such that said actuators are deactivated at their neutral positions which correspond to zero pitch positions of the blades. Thus programmer 300 is not only effective for adjusting blades E to the proper pitch angles according to the speed of rotor rotation for maintaining balanced flight in the helicopter mode, but it is also effective for ensuring that blades E are at neutral pitch positions when the rotor is in a stationary condition.

It was previously stated that vanes 86 and dampers 102 located in tip-jet portions 80 of blades E, are moved to and from their solid and dotted line positions seen in FIGS. 4 and 9, by two position actuators M1 and M2 (FIG. 28) through control switches S1 and S2, respectively. However, since these switches are pilot-actuated they are located in the fuselage, and the conductors involved in the electrical circuits for energizing the actuators in all three blades are carried through hub H by a suitable conduit 78 which terminates in an outlet box $78^1$ fixed to the top of plenum chamber 76 (see FIG. 18). From box $78^1$ the circuits are divided into branches such that actuators M1 of all three blades respond concurrently to switch S1, and that actuators M2 of all three blades respond concurrently to switch S2. A collector ring mechanism 79 is coupled to the lower end of conduit 78 for providing circuit continuity between the conductors carried by conduit 78 and the stationary conductors from an electrical energy source and from switches S1 and S2 (see FIG. 27).

Attention is also directed to the previously mentioned diverter valves 70 and $70^1$ shown as part of the gas-conducting passageways in FIGS. 1 and 3, which valves are provided with dampers 47 and 48 as illustrated in FIG. 25 where the construction involved in diverter valve $70^1$ is also representative of the construction involved in diverter valve 70. In each valve, dampers 47 and 48 are interconnected with a suitable linkage for constant operation by a two-position actuator (FIG. 26) such that in FIG. 1, when the actuators have moved the dampers to their solid-line positions shown in FIG. 25, pressurized gas from generators G and $G^1$ is directed to rotor D and diverted from nozzles 71 and $71^1$, and when the actuators have moved the dampers to their dotted line positions also shown in FIG. 25, the pressurized gas is diverted from the rotor and directed to the nozzles. The two-position actuators identified as M9 for valve 70, and M10 for valve $70^1$ in FIG. 3, are of the same construction as actuators M in FIG. 28, and are respectively controlled by separate switches S7 and S8 for independent operation of the diverter valves.

*Operation*

For purposes of describing the operation of aircraft A, the two energizing positions of switches S1, S2 and S3 seen in FIG. 18, switch S4 and S5 seen in FIGS. 20 and 23, and switches S7 and S8 seen in FIG. 3 are identified by reference characters $h$ and $a$ which respectively designate the helicopter and the airplane flight modes of the aircraft. Thus when the above-identified switches are in their $h$ positions the following conditions prevail: rotor-locking pin 115 is withdrawn from plate 116 by actuator M3 (FIG. 18); guide vanes 86 and dampers 102 in the tip-portions 80 of blades E are moved to their solid-line positions by actuators M1 and M2 (FIGS. 4 and 9); dampers 47 and 48 of diverter valves 70 and $70^1$ are moved to their solid-line positions (FIG. 25) by actuators M9 and M10 (FIG. 3); shiftable bell cranks 160, 170 and 180 are positioned by actuators M4, M5 and M6 as shown in FIG. 20; and shiftable bell cranks 190 and 240 are positioned by actuators M7 and M8 also as shown in FIG. 20. Under the above conditions, the passageways interconnecting nozzles 71 and $71^1$ with generators G and $G^1$ are blocked; whereas the passageways through hub H and blades E interconnecting the generators with the thrust-producing openings 87 and 88 in the tip-jet portion 80 of blades E are open. Thus, pressurized-gas produced by the generators is expelled outwardly of the latter openings such that the forces of reaction are effective for driving rotor D at the required rotational velocity for operating the aircraft in the helicopter flight mode.

When the velocity of rotor-rotation is adequate for blades E to produce the thrust required for sustaining aircraft A in a helicopter mode of airborne flight, cyclical and collective pitch control levers 200 and 220 can be manipulated by a pilot such that changes in the pitch angles of the blades occur both collectively and cyclically for maneuvering the aircraft in the manner of a conventional helicopter.

Any time after the speed of forward flight in the helicopter mode exceeds a predetermined minimum, the pilot may elect to operate the aircraft in the manner of a conventional airplane. This transition is effected by decelerating the rotor to a stationary condition and diverting the pressurized gas from tip-jet portions 80 of the blades to the thrust-producing nozzles 71 and $71^1$ such that sustention of the aircraft is transferred from the thrust-producing blades to the lift-producing airfoil-shaped hub. To accomplish the transition from the helicopter flight mode to the airplane flight mode, switches S1 and S2 are moved to their $a$ positions which in turn, causes movements of vanes 86 and dampers 102 by actuators M1 and M2 such that thrust-producing openings 88 are blocked to pressurized gas by vanes 86, and thrust-producing openings 100 are opened and openings 87 are blocked to the pressurized gas by dampers 102. At about the same time that switches S1 and S2 are moved to their $a$ positions, first one and then the other of the switches S7 and S8 are moved to their $a$ position so that by the time the rotor has decelerated to a stationary condition, actuators M9 and M10 have operated diverter valves 70 and $70^1$ such that all pressurized gas being produced by generators G and $G^1$ is expelled outwardly of nozzles 71 and $71^1$ for propelling the aircraft.

During rotor deceleration, the pilot may choose to continue the manual control of the blade pitch angles through manipulation of cyclical and collective pitch control levers 200 and 220. In which case, the shiftable bell crank 160, 170 and 180 are maintained in their respective positions as shown in FIG. 20; then, when the rotor is substantially stationary, switch S4 is moved to its $a$ position and bell cranks 160, 170 and 180 are shifted by actuators M4, M5 and M6 to their positions shown in FIGS. 23 and 24. Once the rotation of rotor D has ceased, it may if necessary, be properly aligned according to the showing in FIG. 1, by motor 110 through operation of switch S0 (FIG. 18). Following its alignment, the rotor is locked in this position by actuator M3 responding to movement of switch S3 to its $a$ position. Since the two laterally extending blades E of the stationary rotor function as ailerons in the airplane flight mode, bell cranks 190 and 240 must be shifted from their positions shown in FIG. 20 to positions as seen in FIG. 23 by the time the rotor is locked in its stationary condition so that movements of cyclical control lever 200 in the directions indicated by arrows 203 and $203^1$ can be effective for operating the two blades as ailerons. Hense, switch S5 should be moved to its $a$ position such that the shift of bell cranks 190 and 240 to their positions seen in FIG. 23 by actuators M7 and M8 is completed by the end of the deceleration period.

A unique feature of this invention resides in the fact that the pilot may choose to control the pitch angles of blades E automatically during rotor deceleration by employing the programming mechanism 300. In this case, after switches S1, S2, S7 and S8 have been moved to their $a$ positions as above described for effecting rotor deceleration and providing the forces required for airplane propulsion, switch S4 is moved from position $h$ to position $a$ so that bell cranks 160, 170 and 180 are shifted by actuators M4, M5 and M6 to their positions shown in FIGS. 23 and 24 at the very beginning of the rotor deceleration period. Prior to or at about the same time that switch S4 is moved to its $a$ position, switch S6 is placed in its DEC. position so that actuators N1, N2 and N3 are immediately effective for applying vertical and tilting movements to the swash plate mechanism at the instant bell cranks 160, 170 and 180 have completed their shift from the positions in FIG. 20 to the position seen in FIGS. 23 and 24. As in the case where manual control of blade pitch angles is continued during rotor deceleration, switch S5 should be moved to its $a$ position so that the shift of bell cranks 190 and 240 to their positions seen in FIG. 23 by actuators M7 and M8 is completed by the time the rotor is locked in its stationary condition as above described. Thus, movements of cyclical pitch control lever 200 in the directions indicated by arrows 203 and 203¹ can be effective for operating the two laterally extending blades as ailerons.

It is to be noted that, during the transition period involved in the in-flight conversion from the helicopter flight mode to the airplane flight mode, vertical rudder 131 and the decelerating tail rotor 130 are under pilot control through rudder pedals 233 and 234; and that horizontal rudders 132 and 133 are also under pilot control through cyclical pitch control lever 200, (see FIGS. 20 and 23). Hence, the directional heading, as well as the pitching and rolling movements of the aircraft are under control of the pilot while the forces required for sustaining the aircraft in air-borne flight are transferred from the thrust-producing blades of the decelerating rotor to the airfoil-shaped hub. It is also to be noted that, after the rotor is locked in a stationary condition, transition from the helicopter flight mode to the airplane mode of flght is completed and the two laterally extending blades become effective as ailerons operating in conjunction with the two horizontal rudders for producing or counteracting rolling movements of the aircraft in response to pilot manipulation of the cyclical control lever 200 during flight in the airplane mode.

It is further pointed out that, once rotor rotation has ceased, each of the fairings 90 pivotally mounted in tip-jet portions 80 of blades E moves under the influence of spring 93 (FIG. 9) to a position closing thrust-producing openings 87 and 88 as shown in FIG. 4. Moreover, since there is no particular advantage in maintaining vanes 86 and dampers 102 in their dotted-line positions, switches S1 and S2 should be moved to their h positions for causing operation of actuators M1 and M2 such that said vanes and dampers are returned to their solid-line positions after the aircraft begins operation in the airplane mode.

Once switches S1 and S2 have been moved to their h positions blades E are in readiness for operation in the helicopter flight mode, and in-flight conversion from airplane flight to helicopter flight is easily accomplished as follows: the rotor is unlocked by moving switch S3 to position h; first one and then the other of the switches S7 and S8 are moved to their h positions so that by the time the rotor has accelerated to a rotational velocity adequate for blades E to produce the thrust required for sustaining the aircraft in the helicopter mode, diverter valves 70 and 70¹ shall have operated such that all pressurized-gas produced by generators G and G¹ is diverted from nozzles 71 and 71¹ to openings 87 and 88 in tip-jet portions 80 of blades E.

As in the conversion from helicopter flight to airplane flight, the pilot may choose to employ programming mechanism 300 for automatically controlling the pitch angles of blades E during the time required for the rotor to accelerate to optimum rotational velocity. In which case, switch S6 is placed in the ACC. position and switch S5 is moved to position h at about the same time the rotor is unlocked so that shiftable bell cranks 190 and 240 are positioned as shown in FIGS. 20 and 24, and actuators N1, N2 and N3 are immediately effective for applying vertical and tilting movements to swash plate mechanism 120 at the very beginning of rotor acceleration. Now, after the rotor has accelerated to optimum rotational velocity, and manual control of blade pitch angles is desired by the pilot, switch S4 is moved to its h position for causing bell cranks 160, 170 and 180 to be shifted by actuators M4, M5 and M6 to their respective positions shown in FIG. 20. Once this shift is completed, the aircraft becomes fully operable in the helicopter flight mode.

Should the pilot elect to control the pitch angles of the blades manually instead of automatically during the time required for the rotor to accelerate to the desired rotational velocity, switches S4 and S5 are moved simultaneously to their h positions so that shiftable bell cranks 160, 170 and 180, and shiftable bell cranks 190 and 240 will have been positioned as shown in FIG. 20 at the time rotor acceleration begins. As to switch S6, it may be positioned in either the DEC. or ACC. position because actuators N1, N2 and N3, operating in response to programmer 300, are ineffective for applying any movements to the swash plate mechanism when bell cranks 160, 170, 180, 190 and 240 are positioned as shown in FIG. 20; however, it is preferable that switch S6 be placed in its OFF position. Under this manual control of blade pitch angles during transition from airplane flight to helicopter flight, the aircraft is completely operable for performing the normal maneuvers of a conventional helicopter when the rotor attains optimum rotational velocity.

The importance of programmer 300 and actuators N1, N2 and N3 result from their capabilities of applying vertical and tilting movements to the swash plate mechanism according to the rotational velocity of the rotor when bell cranks 160, 170, 180, 190 and 240 are positioned as shown in FIG. 24, such that during transition from one flight mode to the other, the blade pitch angles are controlled automatically for maintaining optimum lift and balanced flight while the rotor is decelerating to a stationary condition or is accelerating to its normal rotating condition. Moreover, when the rotor is in a stationary condition and switch S6 is positioned in either the DEC. or ACC. position, the programming mechanism is activated such that actuators N1, N2 and N3 are effective for automatically adjusting the pitch angles of all blades to zero.

What is claimed as new is:

1. An aircraft suitable for selective operation in helicopter or airplane modes of airborne flight and for in-flight conversion from one mode to the other, said aircraft comprising:
   (A) a fuselage having a tail section;
   (B) a source of pressurized gas;
   (C) sustaining means mounted on the fuselage for stationary and rotating conditions, said sustaining means being characterized by
      (a) an airfoil shaped hub of symmetrical plan form, and by
      (b) three radially-extending thrust-producing blades connected to the hub so as to accommodate changes in the pitch angles of the blades relative to the hub;
      (c) the plan form and airfoil section of the hub being such that when the sustaining means is in a stationary condition said hub is effective for sustaining the aircraft in the airplane flight mode; and
      (d) the character of the blades being such that when the sustaining means is in a rotating condition the blades are effective for sustaining the aircraft in the helicopter flight mode, said blades being further characterized by
      (e) tip-portions provided with first and second jet-producing openings constructed and arranged such that the first openings are effective for expelling jets of pressurized gas for causing rotation of the sustaining means, and such that the second openings are effective for expelling jets of pressurized gas for counteracting rotation of the sustaining means effected by the jets of pressurized gas expelled by the first openings;
   (D) nozzle means associated with the fuselage for expelling a thrust-producing jet of pressurized gas for propelling the aircraft in the airplane flight mode;

(E) gas-conducting means extending through the airfoil-shaped hub and the thrust-producing blades interconnecting the first and second openings in the tip-portions of said blades with the source of pressurized gas and the nozzle means, said gas-conducting means including
  (a) first instrumentalities for selectively directing the flow of pressurized gas from the source to the first and second jet-producing openings in the tip-portions of said blades or to the nozzle means, and
  (b) second instrumentalities associated with said tip-portions of the blades for directing the flow of pressurized gas through the first or second openings such that the jet-producing functions of said openings are effective for causing rotation of the sustaining means or for stopping such rotation;
(F) positioning means for fixedly locating the sustaining means in a stationary condition such that two of the thrust-producing blades extend laterally from opposite sides of the fuselage and the third blade extends in longitudinal alignment with said fuselage, said positioning means including
  (a) a locking mechanism having a fixed member attached to the fuselage and a movable member adapted for engaging the hub of the sustaining means;
(G) a swash plate mechanism adapted to assume different attitudes in the response to vertical and tilting movements applied thereto, said mechanism being coupled to the thrust-producing blades such that said different attitudes are effective for causing changes in the pitch angles of said blades;
(H) manually operable collective and cyclical pitch control levers;
(I) means for applying vertical and tilting movements to the swash plate mechanism, said means including
  (a) first shiftable means constructed and arranged for operation in first and second positions;
(J) means interconnecting the first shiftable means and the collective and cyclical pitch control levers such that said first shiftable means is effective in its first position for applying movements of said control levers to the swash plate mechanism for causing changes in the pitch angles of all three thrust-producing blades when the sustaining means is in a rotating condition such that said changes are effected collectively and cyclically for maneuvering the aircraft in the helicopter flight mode; and
(K) means associated with the first shiftable means and the cyclical pitch control lever, constructed and arranged such that said first shiftable means is effective in its second position for applying predetermined movements of the cyclical control lever to the swash plate mechanism for causing changes in the pitch angles of the two laterally extending blades when the sustaining means is in a stationary condition such that said two blades function as ailerons during operation of the aircraft in the airplane flight mode.

2. The combination defined in claim 1 in which the means for applying predetermined movements of the cyclical control lever to the swash plate mechanism comprises:
  (A) power-actuated means operable independently of the collective and cyclical pitch control levers for producing movements of a character equivalent to movements resulting from manual operation of said control levers;
  (B) second shiftable means constructed and arranged for operation in first and second positions, operably associated with the first shiftable means, the power-actuated means and the cyclical pitch control lever such that when the first shiftable means is in its second position and the second shiftable means is in its first position said second shiftable means is effective for causing movements produced by the power-actuated means to be applied to the swash plate mechanism, and such that when the first shiftable means is in its second position and the second shiftable means is in its second position said second shiftable means is effective for causing the predetermined movements of the cyclical control lever to be applied to the swash plate mechanism; and
  (C) means responsive to rotating velocity of the sustaining means for energizing the power-actuated means such that vertical and tilting movements are effectively applied to the swash plate mechanism by said power-actuated means such that the pitch angles of the thrust-producing blades are automatically controlled when the first shiftable means is in its second position and the second shiftable means is in its first position for maintaining the aircraft in balanced airborne flight while the sustaining means is in a rotating condition.

3. The combination according to claim 2 in which the power-actuated means is characterized by movable elements operatively coupled to the first shiftable means; and in which the means for energizing said power-actuated means is characterized by a speed-sensing governor.

4. The combination defined in claim 1 in which the positioning means is further characterized by a motor drivingly associated with the sustaining means hub and adapted for incremental rotation of the sustaining means for expeditiously achieving the stationary condition of said sustaining means.

5. The combination according to claim 4 in which the means for applying predetermined movements of the cyclical control lever to the swash plate mechanism comprises:
  (A) power-actuated means operable independently of the collective and cyclical pitch control levers for producing movements of a character equivalent to movements resulting from manual operation of said control levers;
  (B) second shiftable means constructed and arranged for operation in first and second positions, operably associated with the first shiftable means, the power-actuated means and the cyclical pitch control lever such that when the first shiftable means is in its second position and the second shiftable means is in its first position said second shiftable means is effective for causing movements produced by the power-actuated means to be applied to the swash plate mechanism, and such that when the first shiftable means is in its second position and the second shiftable means is in its second position said second shiftable means is effective for causing the predetermined movements of the cyclical control lever to be applied to the swash plate mechanism; and
  (C) means responsive to rotating velocity of the sustaining means for energizing the power-actuated means such that vertical and tilting movements are effectively applied to the swash plate mechanism by said power-actuated means such that the pitch angles of the thrust-producing blades are automatically controlled when the first shiftable means is in its second position and the second shiftable means is in its first position for maintaining the aircraft in balanced airborne flight while the sustaining means is in a rotating condition.

6. The combination according to claim 5 in which the power-actuated means is characterized by movable elements operatively connected to the first shiftable means; and in which the energizing means is characterized by a speed-sensing governor drivenly connected to the hub of the sustaining means.

7. The combination according to claim 5 in which said energizing means is further characterized by means responsive to movements of the movable elements in the power-actuated means and to the operation of the speed-sensing governor for producing signals; and by means responsive to said signals for energizing the power-actuated means.

8. The combination according to claim 5 in which said energizing means is further characterized by means responsive to movements of the movable elements in the power-actuated means and to the operation of the speed-sensing governor for producing signals; by means for amplifying said signals; and by means responsive to the amplified signals for energizing the power-actuated means.

9. The combination according to claim 5 in which the power-actuated means comprises electric motor means having movable elements operatively connected to the first shiftable means; and in which the energizing means is further characterized by means responsive to movements of said movable elements.

10. The combination according to claim 9 in which said energizing means comprises:

(A) first and second potentiometer means connected in bridge-circuit formation having first and second input terminals adapted for connection to an electrical energy source, and first and second output terminals comprising first and second sliding arms connected to the movable elements of the electric motor means and to the speed-sensing governor such that movements of said sliding arms are effective for causing voltages of varying magnitude to exist at said output terminals;

(B) means for amplifying the varying voltages existing at said output terminals; and (C) means responsive to the amplified voltages for energizing said electric motor means.

References Cited

UNITED STATES PATENTS

| | | | |
|---|---|---|---|
| 3,119,577 | 1/1964 | Andrews | 244—7 |
| 3,246,862 | 4/1966 | Celniker et al. | 244—7 |
| 3,273,655 | 9/1966 | Girard | 244—7 |

MILTON BUCHLER, *Primary Examiner.*

A. E. CORRIGAN, *Assistant Examiner.*